United States Patent
Kim et al.

(10) Patent No.: US 10,965,500 B2
(45) Date of Patent: *Mar. 30, 2021

(54) METHOD AND DEVICE FOR ESTIMATING CHANNEL IN WIRELESS COMMUNICATION SYSTEM

(71) Applicant: LG ELECTRONICS INC., Seoul (KR)

(72) Inventors: Hyungtae Kim, Seoul (KR); Kijun Kim, Seoul (KR); Jonghyun Park, Seoul (KR); Youngtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/554,227

(22) Filed: Aug. 28, 2019

(65) Prior Publication Data

US 2019/0386854 A1    Dec. 19, 2019

Related U.S. Application Data

(63) Continuation of application No. 15/324,616, filed as application No. PCT/KR2015/007402 on Jul. 16, 2015, now Pat. No. 10,439,846.

(Continued)

(51) Int. Cl.
*H04L 25/02* (2006.01)
*H04L 5/00* (2006.01)
(Continued)

(52) U.S. Cl.
CPC ....... *H04L 25/0226* (2013.01); *H04B 7/0452* (2013.01); *H04B 7/0456* (2013.01);
(Continued)

(58) Field of Classification Search
CPC ... H04B 7/0452; H04B 7/0456; H04J 13/004; H04J 13/18; H04L 5/0051; H04L 25/0226; H04W 72/042
See application file for complete search history.

(56) References Cited

U.S. PATENT DOCUMENTS 9,800,381 B2   10/2017   Chen et al.
10,439,846 B2*  10/2019   Kim ................... H04J 13/004
(Continued)

FOREIGN PATENT DOCUMENTS

CN   102714527   10/2012
CN   103220073   7/2013
(Continued)

OTHER PUBLICATIONS

The State Intellectual Property Office of the People's Republic of China Application Serial No. 201580022487, Office Action dated Nov. 8, 2018, 20 pages.

(Continued)

*Primary Examiner* — Chi H Pham
*Assistant Examiner* — Weibin Huang
(74) *Attorney, Agent, or Firm* — Lee, Hong, Degerman, Kang & Waimey

(57) ABSTRACT

A method by which a terminal estimates a channel in a wireless access system can comprises the steps of: receiving mapping information on a port and a layer of a data demodulation reference signal (DMRS); receiving change information on whether the port of the DMRS has been changed; and determining a change in port information on the basis of an indicator and estimating a channel of the DMRS.

20 Claims, 13 Drawing Sheets

Related U.S. Application Data

(60) Provisional application No. 62/025,478, filed on Jul. 16, 2014, provisional application No. 62/109,626, filed on Jan. 30, 2015.

(51) Int. Cl.

| | | |
|---|---|---|
| *H04B 7/0452* | (2017.01) | |
| *H04B 7/0456* | (2017.01) | |
| *H04J 13/00* | (2011.01) | |
| *H04J 13/18* | (2011.01) | |
| *H04W 72/04* | (2009.01) | |

(52) U.S. Cl.
CPC ............ *H04J 13/004* (2013.01); *H04J 13/18* (2013.01); *H04L 5/00* (2013.01); *H04L 5/0051* (2013.01); *H04L 25/02* (2013.01); *H04W 72/042* (2013.01); *H04L 5/0023* (2013.01)

(56) References Cited

U.S. PATENT DOCUMENTS

| | | | |
|---|---|---|---|
| 2010/0310005 A1 | 12/2010 | Takagi et al. | |
| 2011/0274197 A1* | 11/2011 | Zhu | H04L 1/0031 375/267 |
| 2012/0300728 A1* | 11/2012 | Lee, II | H04L 5/0023 370/329 |
| 2013/0021991 A1* | 1/2013 | Ko | H04W 72/048 370/329 |
| 2013/0022087 A1 | 1/2013 | Chen et al. | |
| 2013/0114656 A1* | 5/2013 | Sayana | H04B 7/024 375/219 |
| 2013/0265980 A1 | 10/2013 | Zhu et al. | |
| 2013/0301452 A1* | 11/2013 | Yoon | H04J 13/0074 370/252 |
| 2014/0016681 A1 | 1/2014 | Muruganathan et al. | |
| 2014/0112287 A1 | 4/2014 | Chun et al. | |
| 2014/0133395 A1* | 5/2014 | Nam | H04L 5/0023 370/328 |
| 2014/0321369 A1 | 10/2014 | Davydov et al. | |
| 2015/0063238 A1 | 3/2015 | Yokomakura et al. | |
| 2015/0229493 A1* | 8/2015 | Lee | H04L 25/0256 370/252 |
| 2015/0341958 A1* | 11/2015 | Guo | H04L 5/0051 370/329 |
| 2016/0087709 A1 | 3/2016 | Horiuchi et al. | |
| 2016/0173262 A1 | 6/2016 | Davydov et al. | |
| 2016/0192338 A1 | 6/2016 | Benjebbour et al. | |
| 2017/0207932 A1 | 7/2017 | Kim et al. | |

FOREIGN PATENT DOCUMENTS

| | | |
|---|---|---|
| JP | 2013526132 | 6/2013 |
| KR | 1020110085878 | 7/2011 |
| WO | 2013151277 | 10/2013 |

OTHER PUBLICATIONS

PCT International Application No. PCT/KR2015/007402, Written Opinion of the International Searching Authority dated Oct. 26, 2015, 20 pages.

Ericsson, "Layer-to-antenna port mapping for LTE-Advanced", R1-100848, 3GPP TSG RAN WG1 Meeting #60, Feb. 2010, 6 pages.

Huawei, "Antenna port association for EPDCCH", R1-124699, 3GPP TSG RAN WG1 Meeting #71, Nov. 2012, 6 pages.

Catr, "Views on layer mapping to DM-RS ports and downlink signalling for rank 3-8", R1-101026, 3GPP TSG RAN WG1 Meeting #60, Feb. 2010, 4 pages.

European Patent Office Application Serial No. 15821824.8, Search Report dated Mar. 2, 2018, 8 pages.

Samsung, "Discussions on DL control signalling for LTE-A MU-MIMO", 3GPP TSG RAN WG1 Meeting #62, R1-104606, Aug. 2010, 3 pages.

Samsung, "Further Discussions on DMRS-Based E-PDCCH Transmission", 3GPP TSG RAN WG1 Meeting #68bis, R1-121641, Mar. 2012, 7 pages.

* cited by examiner

FIG. 5
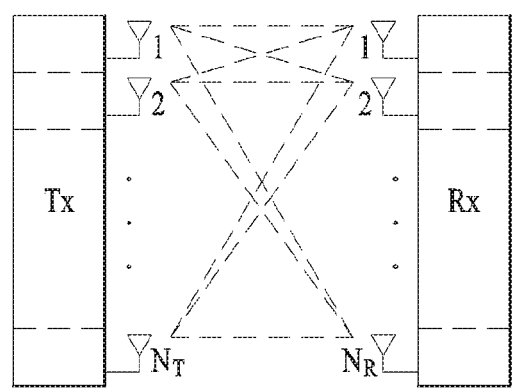
(a)
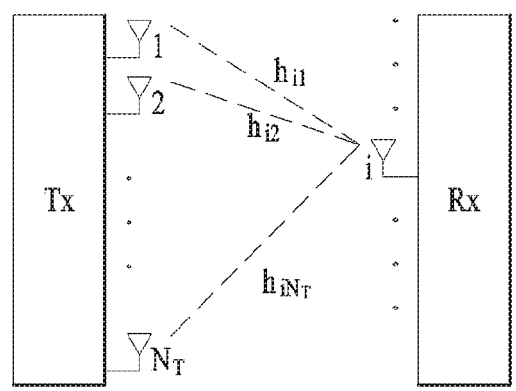
(b)

METHOD AND DEVICE FOR ESTIMATING CHANNEL IN WIRELESS COMMUNICATION SYSTEM

CROSS-REFERENCE TO RELATED APPLICATIONS

This application is a continuation of U.S. patent application Ser. No. 15/324,616, filed on Jan. 6, 2017, now U.S. Pat. No. 10,439,846, which is the National Stage filing under 35 U.S.C. 371 of International Application No. PCT/KR2015/007402, filed on Jul. 16, 2015, which claims the benefit of U.S. Provisional Application No. 62/109,626, filed on Jan. 30, 2015, and 62/025,478, filed on Jul. 16, 2014, the contents of which are all incorporated by reference herein in their entireties.

TECHNICAL FIELD

The present invention relates to a wireless communication system, and more particularly, to a method of estimating a channel in a wireless communication system supporting MU-MIMO and an apparatus supporting the same.

BACKGROUND ART

MIMO (multi-input multi-output) technology corresponds to a technology for increasing data transmission and reception efficiency using a plurality of transmission antennas and a plurality of reception antennas instead of using a single transmission antenna and a single reception antenna. If a single antenna is used, a receiving end receives data through a single antenna path. On the contrary, if multiple antennas are used, the receiving end receives data through several paths, thereby enhancing transmission speed and transmission capacity and increasing coverage.

A single-cell MIMO operation can be divided into a single user-MIMO (SU-MIMO) scheme that a single user equipment (UE) receives a downlink signal in a single cell and a multi user-MIMO (MU-MIMO) scheme that two or more UEs receive a downlink signal in a single cell.

Channel estimation corresponds to a procedure of restoring a received signal by compensating a distortion of the signal distorted by fading. In this case, the fading corresponds to a phenomenon of rapidly changing strength of a signal due to multi-path time delay in wireless communication system environment. In order to perform the channel estimation, it is necessary to have a reference signal known to both a transmitter and a receiver. The reference signal can be simply referred to as an RS (reference signal) or a pilot depending on a standard applied thereto.

A downlink reference signal corresponds to a pilot signal for coherently demodulating PDSCH (physical downlink shared channel), PCFICH (physical control format indicator channel), PHICH (physical hybrid indicator channel), PDCCH (physical downlink control channel) and the like. A downlink reference signal can be classified into a common reference signal (CRS) shared by all UEs within a cell and a dedicated reference signal (DRS) used for a specific UE only. Compared to a legacy communication system supporting 4 transmission antennas (e.g., a system according to LTE release 8 or 9 standard), a system including an extended antenna configuration (e.g., a system according to LTE-A standard supporting 8 transmission antennas) is considering DRS-based data demodulation to efficiently manage a reference signal and support an enhanced transmission scheme. In particular, in order to support data transmission through an extended antenna, it may be able to define a DRS for two or more layers. Since a DRS and data are precoded by a same precoder, it is able to easily estimate channel information, which is used for a receiving end to demodulate data, without separate precoding information.

Although a downlink receiving end is able to obtain precoded channel information on an extended antenna configuration through a DRS, it is required for the downlink receiving end to have a separate reference signal except the DRS to obtain channel information which is not precoded. Hence, it is able to define a reference signal for obtaining channel state information (CSI), i.e., a CSI-RS, at a receiving end in a system according to LTE-A standard.

DISCLOSURE OF THE INVENTION

Technical Task

In the following, the present invention intends to propose a method of estimating a channel in a wireless communication system and an apparatus therefor based on the aforementioned discussion.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of estimating a channel, which is estimated by a user equipment in a wireless access system, includes the steps of receiving mapping information on a port and a layer of a data demodulation reference signal (DMRS), receiving change information on whether the port of the DMRS has been changed, and determining a change in port information on the basis of an indicator and estimating a channel of the DMRS.

If the change information indicates a change of the port, it can be determined as port swapping has been performed in a CDM (code division multiplexing) group for an identical frequency resource.

If the change information indicates a change of the port, it can be determined as port swapping has been performed between CDM (code division multiplexing) groups for a different frequency resource.

The change information can be determined on the basis of a PQI (PDSCH RE mapping and quasi co-location indicator).

The change information can be determined according to set information of EPDCCH (Enhanced Physical Downlink Control Channel).

The change information can be determined using a C-RNTI (cell-radio network temporary identifier) assigned to the user equipment.

The change information can be determined using a remaining value resulted from dividing the C-RNTI by the number of combinations of port swapping.

To further achieve these and other advantages and in accordance with the purpose of the present invention, according to a different embodiment, a user equipment estimating a channel in a wireless communication system can include an RF (radio frequency) unit and a processor, the processor configured to receive mapping information on a port and a layer of a data demodulation reference signal (DMRS), the processor configured to receive change information on whether the port of the DMRS has been changed, the processor configured to determine a change in port information on the basis of an indicator and receive a signal.

If the change information indicates a change of the port, it can be determined as port swapping has been performed in a CDM (code division multiplexing) group for an identical frequency resource.

If the change information indicates a change of the port, it can be determined as port swapping has been performed between CDM (code division multiplexing) groups for a different frequency resource.

The change information can be determined on the basis of a PQI (PDSCH RE mapping and quasi co-location indicator).

The change information can be determined according to set information of EPDCCH (Enhanced Physical Downlink Control Channel).

The change information can be determined using a C-RNTI (cell-radio network temporary identifier) assigned to the user equipment.

The change information can be determined using a remaining value resulted from dividing the C-RNTI by the number of combinations of port swapping.

Advantageous Effects

According to embodiments of the present invention, it is able to provide a method of estimating a channel in a wireless communication system and an apparatus therefor.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram for a configuration of a wireless communication system including a plurality of antennas;

BEST MODE

Mode for Invention

Figure 1:
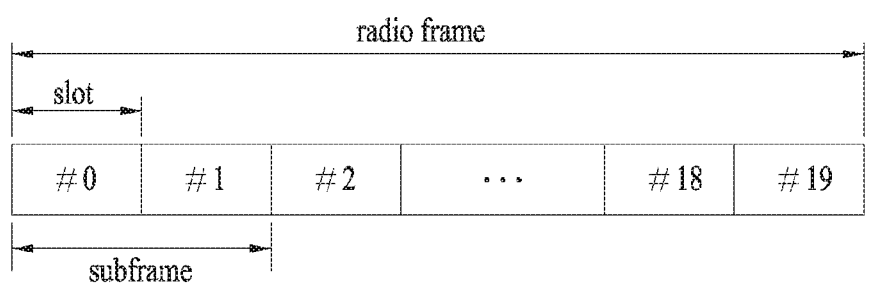
FIG. 1 is a diagram for a structure of a downlink radio frame.

The embodiments described in the following correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment.

In this specification, embodiments of the present invention are described centering on the data transmission/reception relations between a user equipment and an eNode B. In this case, the eNode B may correspond to a terminal node of a network directly performing communication with the user equipment. In this disclosure, a specific operation explained as performed by an eNode B may be performed by an upper node of the eNode B in some cases.

In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like. A terminal may be substituted with such a terminology as a relay node (RN), a relay station (RS), and the like. And, a terminal may be substituted with such a terminology as a user equipment (UE), a mobile station (MS), a mobile subscriber station (MSS), and the like.

Specific terminologies used in the following description are provided to help understand the present invention and the use of the specific terminologies can be modified into a different form in a range of not deviating from the technical idea of the present invention.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Embodiments of the present invention may be supported by the standard documents disclosed in at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP ($3^{rd}$ Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE and LTE-A standards, by which the technical idea of the present invention may be non-limited.

A structure of a downlink radio frame is explained in the following with reference to FIG. 1.

Referring to FIG. 1, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 1 is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol period. The OFDM symbol may be referred to as SC-FDMA symbol or symbol period. The resource block (RB) as a resource allocation unit may include a plurality of continuous subcarriers in one slot.

The number of OFDM symbols included in one slot may vary depending on a configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first two or three OFDM symbols of each subframe may be allocated to a physical downlink control channel (PDCCH), and the other OFDM symbols may be allocated to a physical downlink shared channel (PDSCH).

The aforementioned structure of a radio frame is just an example only. The number of subframes included in a radio frame, the number of slots included in a subframe and the number of symbols included in a slot may be modified in various ways.

Figure 2:
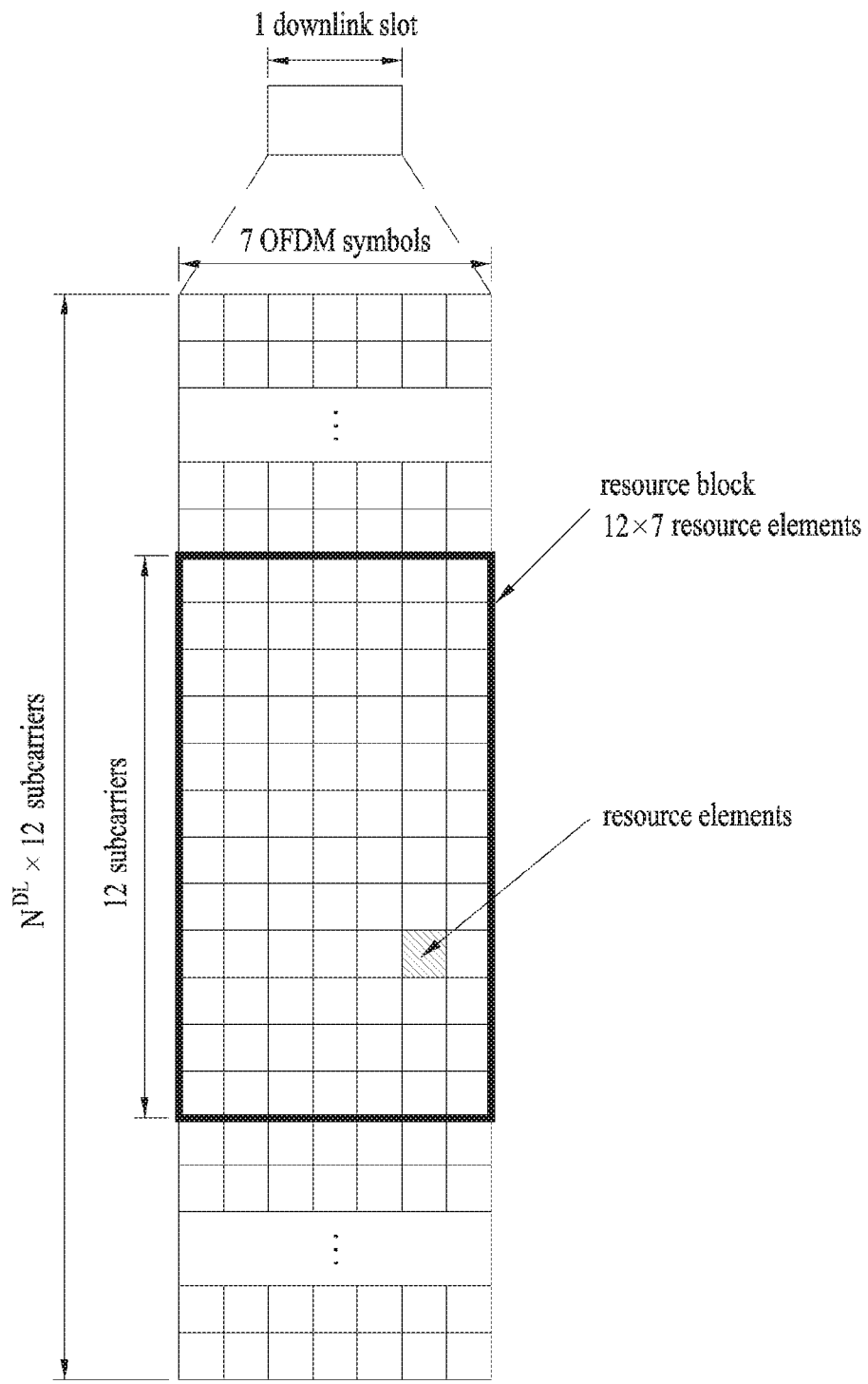
FIG. 2 is a diagram for an example of a resource grid of a downlink slot.

FIG. 2 is a diagram for an example of a resource grid of a downlink slot. FIG. 2 shows a case that an OFDM symbol is configured by a normal CP. Referring to FIG. 2, a downlink slot includes a plurality of OFDM symbols in a time domain and a plurality of resource blocks in a frequency domain. In this case, although FIG. 2 illustrates that a downlink slot includes seven OFDM symbols and a resource block includes twelve subcarriers, by which the present invention may be non-limited. Each element on the resource grid will be referred to as a resource element (RE). For example, an RE a (k, l) may correspond to an RE positioned at a $k^{th}$ subcarrier and an $l^{th}$ OFDM symbol. In case of a normal CP, one resource block includes 12*7 resource elements (in case of an extended CP, one resource block includes 12*6 resource elements). Since a space between subcarriers corresponds to 15 kHz, one resource block includes about 180 kHz in frequency domain. $N_{DL}$ corresponds to the number of resource blocks included in a downlink slot. A value of the $N_{DL}$ can be determined according to a downlink transmission bandwidth scheduled by a base station.

Figure 3:
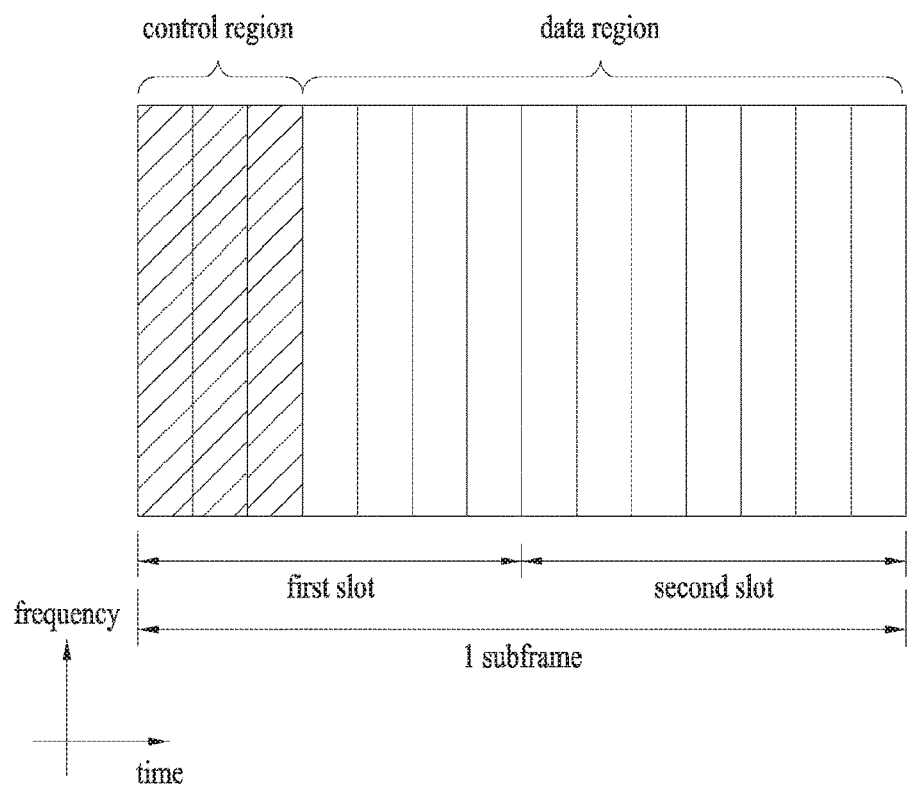
FIG. 3 is a diagram for structure of a downlink subframe.

FIG. 3 is a diagram illustrating a structure of a downlink subframe. Referring to FIG. 3, maximum three OFDM symbols located at the front of the first slot of a subframe correspond to a control region to which a control channel is allocated. The other OFDM symbols correspond to a data region to which a physical downlink shared channel (PDSCH) is allocated. A basic unit of transmission becomes one subframe. In particular, PDCCH and PDSCH are assigned over two slots. Examples of downlink control channels used in the 3GPP LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK signals in response to uplink transmission. The control information transmitted through the PDCCH will be referred to as downlink control information (DCI). The DCI includes uplink or downlink scheduling information, uplink transmission (Tx) power control command for a random UE group and the like. The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on a correlation between the number of CCEs and a coding rate provided by the CCE. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

Figure 4:
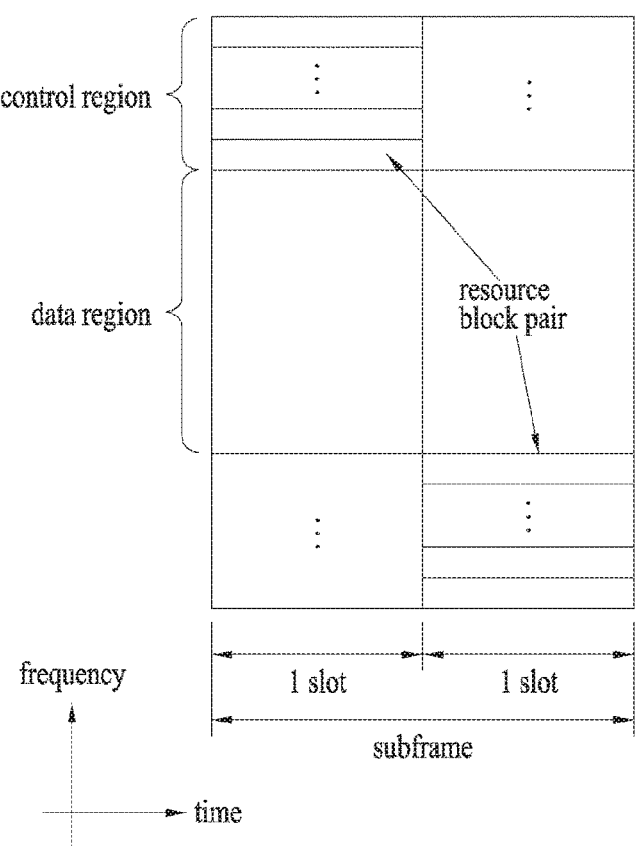
FIG. 4 is a diagram for structure of an uplink subframe.

FIG. 4 is a diagram for structure of an uplink subframe. Referring to FIG. 4, a UL subframe may be divided into a control region and a data region in a frequency domain. A physical uplink control channel (PUCCH) including uplink control information is allocated to the control region and a physical uplink shared channel (PUSCH) including user data is allocated to the data region. In order to maintain single carrier property, a UE does not transmit the PUCCH and the PUSCH at the same time. The PUCCH for one UE is allocated to a resource block pair in a subframe. The resource blocks belonging to the resource block pair occupy a different subcarrier with respect to two slots. This is represented as the resource block pair allocated to the PUCCH is frequency-hopped at a slot boundary.

MIMO System Modeling

A MIMO system is a system for enhancing a data transfer rate using a plurality of transmission antennas and a plurality of reception antennas. A MIMO technology can receive the whole of data by aggregating a plurality of data fragments received through a plurality of antennas with each other without depending on a single antenna path to receive the whole of data.

The MIMO technology includes a spatial diversity scheme and a spatial multiplexing scheme. Since the spatial diversity scheme can increase transmission reliability and widen a cell radius through a diversity gain, the spatial diversity scheme is suitable for transmitting data to a fast moving user equipment. The spatial multiplexing scheme can increase a data transfer rate without increasing a system bandwidth by transmitting data different from each other at the same time.

FIG. 5 is a diagram for a configuration of a wireless communication system including a plurality of antennas. As shown in FIG. 5 (a), if the number of transmission antennas and the number of reception antennas are increased to $N_T$ and $N_R$, respectively, unlike a case that a transmitter or a receiver uses a plurality of antennas only, theoretical channel transmission capacity increases in proportion to the number of antennas. Hence, it is able to considerably enhance transfer rate and frequency efficiency. If the channel transmission capacity increases, the transfer rate may theoretically increase as much as a maximum transfer rate (Ro) of a single antenna multiplied by a rate of increase (Ri).

For example, in a MIMO communication system using 4 transmission antennas and 4 reception antennas, it is able to theoretically obtain a transfer rate as fast as 4 times compared to a single antenna system. After the theoretical capacity increase of the multi-antenna system is proved in the mid-90s, various technologies for increasing data transfer rate using the theoretical capacity increase of the multi-antenna system have been discussed so far. Some of the technologies are already reflected to a standard of various wireless communications such as third generation mobile communication, next generation wireless LAN and the like.

If we look at the research trend related to the multi-antenna until now, many active researches have been performed for such a study of various points of view as a study on information theory related to a multi-antenna communication capacity calculation in various channel environments and multiple access environment, a study on a radio channel measurement and model deduction of the multi-antenna system, a study on a space-time signal processing technology for enhancing a transmission reliability and a transmission rate, and the like.

A communication method of the multi-antenna system is explained in more detail using mathematical modeling. Assume that there exist $N_T$ number of transmission antennas and $N_R$ number of reception antennas.

First of all, if we look into a transmission signal, the maximum number of information capable of being transmitted is $N_T$ when there are $N_T$ number of transmission antennas.

Meanwhile, a transmission signal x can be considered by a different method according to 2 cases (e.g., spatial diversity and spatial multiplexing). In case of the spatial multiplexing, since a different signal is multiplexed and the multiplexed signal is transmitted to a receiving end, an element of information vector(s) has a different value. Meanwhile, in case of the spatial diversity, since an identical signal is repeatedly transmitted through a plurality of channel paths, an element of information vector(s) has an identical value. Of course, it may also consider a combination of the spatial multiplexing and the spatial diversity. In particular, an identical signal is transmitted through a plurality of transmission antennas (e.g., 3) according to the spatial diversity scheme and other signals may be transmitted to a receiving end in a manner of being spatial multiplexed.

When modeling is performed on channels in multi-antenna wireless communication system, the channels can be classified according to an index of transmission/reception antenna. Assume that a channel passing through a transmission antenna j and a reception antenna i is represented as $h_{ij}$. In the $h_{ij}$, be cautious that an index of a reception antenna is first and an index of a transmission antenna is later.

FIG. 5 (b) shows channels between NT number of transmission antennas and a reception antenna i. The channels can be represented by a vector or a matrix in a manner of being bound.

AWGN (Additive White Gaussian Noise) is added to an actual channel after being underwent a channel matrix.

Since a rank of a matrix is defined by a minimum number of the numbers of row or column independent from each other, the rank of the matrix is configured not to be greater than the number of the row or the column.

In MIMO transmission, 'rank' corresponds to the number of paths capable of independently transmitting a signal and 'number of layers' corresponds to the number of signal streams transmitted via each path. In general, since a transmitting end transmits layers as many as the number of ranks used for transmitting a signal, a rank and the number of layers are used as a same meaning unless state otherwise.

Reference Signal (RS)

When a packet is transmitted in a wireless communication system, since the packet is transmitted via a radio channel, a signal may be distorted in the course of transmission. In order for a receiving end to correctly receive the distorted signal, it may be preferable to find out channel information and correct the distortion of the transmitted signal as much as the channel information from a received signal. In order to find out the channel information, a signal known to both of a transmitting end and the receiving end is transmitted and finds out the channel information with the extent of distortion when the signal is received on a channel. The signal known to both the transmitting end and the receiving end is called a pilot signal or a reference signal.

In case of transmitting and receiving data using multiple antennas, it is able to receive a correct signal only when a channel situation between a transmission antenna and a reception antenna is known. Hence, it is necessary to have a separate reference signal according to each transmission antenna.

In a mobile communication system, a reference signal (RS) is mainly classified into two types according to the usage of the RS. One is an RS used for obtaining channel information and another is an RS used for demodulating data. Since the former one is used for a UE to obtain downlink channel information, it is necessary to be transmitted by a wide band. Although a UE does not receive downlink data in a specific subframe, the UE should be able to receive and measure the RS. The RS can also be used for measuring handover and the like. The latter one corresponds to an RS transmitted to a corresponding resource together with a downlink when a base station transmits the downlink. A UE can perform channel estimation by receiving the RS and may be then able to demodulate data. This RS should be transmitted to a region to which data is transmitted.

In legacy 3GPP LTE system (e.g., 3GPP LTE release-8), two kinds of downlink RSs are defined for a unicast service. In particular, one is a common RS (CRS) and another is a dedicated RS (DRS). The CRS is used for obtaining information on a channel status and measuring handover and the like. The CRS may also be referred to as a cell-specific RS. The DRS is used for demodulating data and may also be referred to as a UE-specific RS. In legacy 3GPP LTE system, the DRS is used for demodulating data only and the CRS is used for two purposes, i.e., channel information acquisition and data demodulation.

The CRS is a cell-specifically transmitted RS and is transmitted in every subframe for a wide band. The CRS can be transmitted for maximum 4 antenna ports according to the number of transmission antennas of a base station. For instance, if the number of transmission antennas of a base station corresponds to 2, a CRS for a $0^{th}$ antenna port and a CRS for a Pt antenna port are transmitted. If the number of transmission antennas of a base station corresponds to 4, CRSs for 0 to $3^{rd}$ antenna port are transmitted, respectively.

Figure 6:
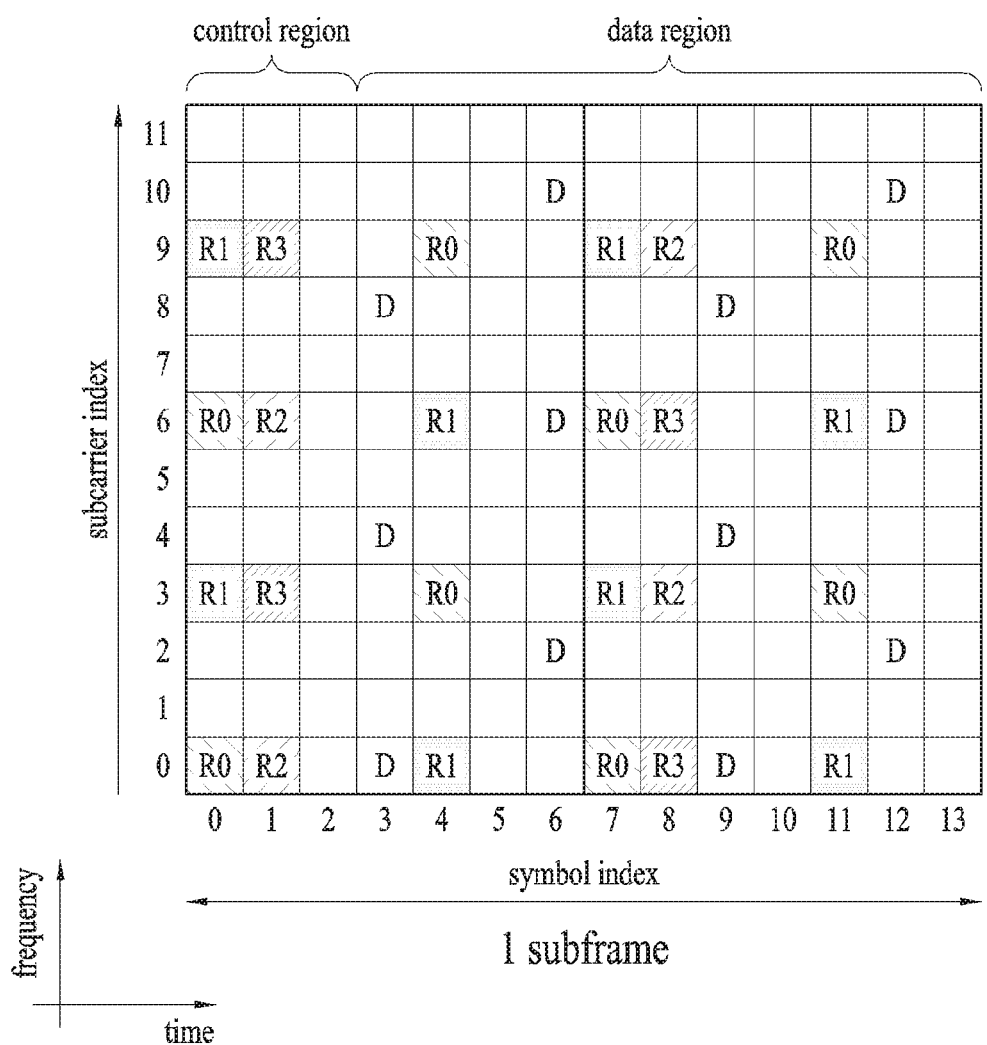
FIG. 6 is a diagram for a legacy pattern of a CRS and a DRS.

FIG. 6 shows a CRS pattern and a DRS pattern in a resource block (in case of a normal CP, 14 OFDM symbols in time axis and 12 subcarriers in frequency axis) of a system that a base station supports 4 transmission antennas. In FIG. 6, resource elements represented as 'R0', 'R1', 'R2' and 'R3' respectively indicate positions of CRSs for an antenna port index 0, 1, 2 and 3. Meanwhile, a resource element represented as 'D' in FIG. 6 indicates a position of a DRS defined in LTE system.

In LTE-A system corresponding to an evolved and advanced version of LTE system, it is able to support maximum 8 transmission antennas in downlink. Hence, RS for the maximum 8 transmission antennas should be supported as well. In LTE system, since a downlink RS is defined by RS for maximum 4 antenna ports only, if a base station includes the number of downlink transmission antennas greater than 4 and maximum 8 in LTE-A system, additional RS for the antenna ports should be defined. The RS for the maximum 8 transmission antenna ports should be designed to satisfy both the RS used for measuring a channel and the RS used for demodulating data.

In designing LTE-A system, one of important considerations is backward compatibility. The backward compatibility means to support a legacy LTE terminal to operate well in LTE-A system. In terms of RS transmission, if additional RS for the maximum 8 transmission antenna ports is added to time-frequency domain where a CRS defined in LTE standard is transmitted to whole band in every subframe, RS overhead becomes considerably big. Hence, in newly designing the RS for the maximum 8 antenna ports, it is necessary to consider reducing the RS overhead.

An RS newly introduced in LTE-A system can be classified into two types. One is an RS (CSI-RS (channel state information-RS)) used for measuring a channel to select MCS (modulation and coding scheme), PMI (precoding matrix index) and the like and another one is an RS (DM-RS (demodulation RS)) used for demodulating data transmitted by maximum 8 transmission antennas.

Unlike a CRS of a legacy LTE system, which is used not only for channel measurement, handover measurement and the like but also for data demodulation, the CSI-RS has a characteristic of being designed mainly for a channel measurement. Of course, the CSI-RS may also be used for measuring handover and the like. Since the CSI-RS is transmitted for the purpose of obtaining information on a channel status only, unlike the CRS of the legacy LTE system, it is not necessary to transmit the CSI-RS in every subframe. Hence, in order to reduce overhead of the CSI-RS, the CSI-RS can be designed to be intermittently (e.g., periodically) transmitted in a time axis.

If data is transmitted in a downlink subframe, a DM RS is dedicatedly transmitted to a UE to which data transmission is scheduled. A DM RS dedicated to a specific UE can be designed to be transmitted in a resource region in which the UE is scheduled, i.e., time-frequency domain to which data for the UE is transmitted only.

Figure 7:
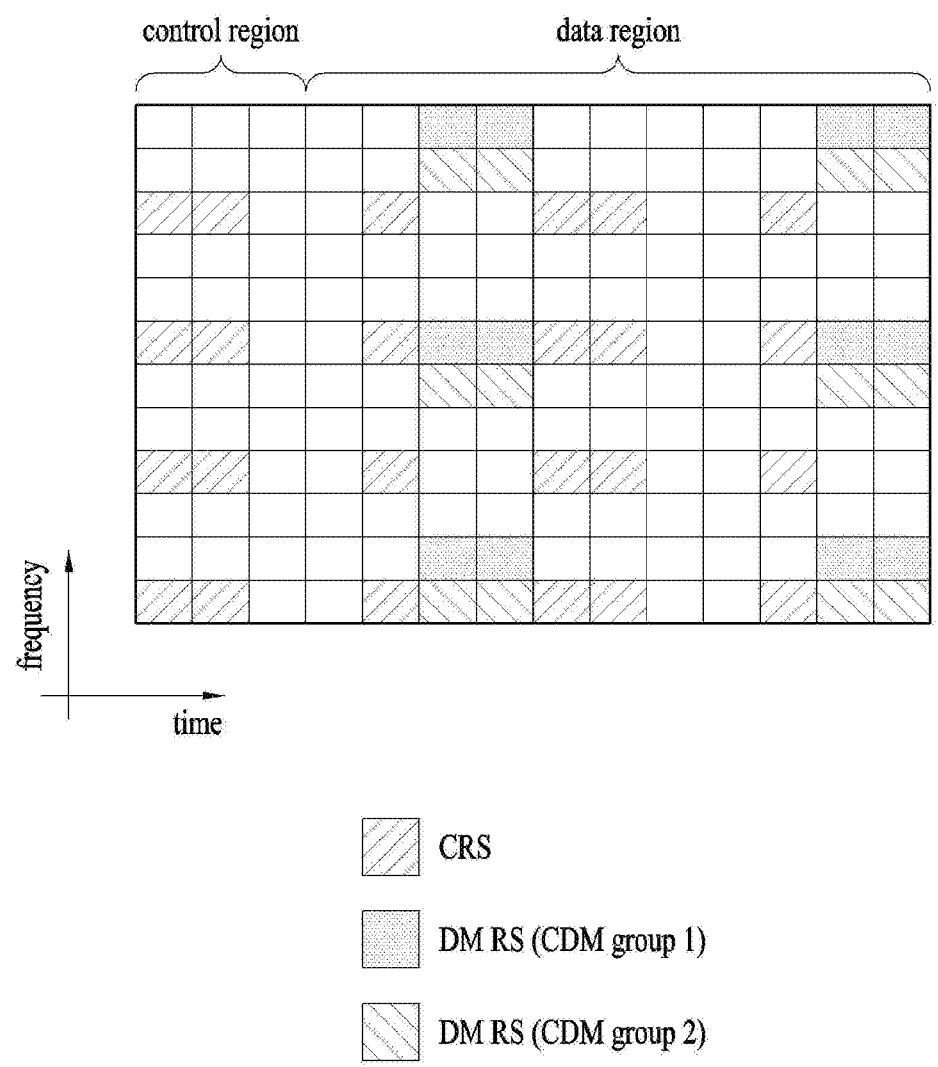
FIG. 7 is a diagram for an example of a DM RS pattern.

FIG. 7 is a diagram for an example of a DM RS pattern defined in LTE-A system. In FIG. 7, in case of one RB pair (in case of a normal CP, 14 OFDM symbols in a time domain×12 subcarriers in a frequency domain) used for DL data transmission, FIG. 7 shows the locations of resource elements (REs) used for DMRS transmission. DMRS may be transmitted to 4 antenna ports (antenna port indexes 7, 8, 9 and 10) additionally defined in the LTE-A system. DMRSs for different antenna ports are located at different frequency resources (subcarriers) and/or different time resources (OFDM symbols), such that each DMRS can be identified (That is, DMRSs may be multiplexed according to the FDM and/or TDM scheme(s)). In addition, DMRSs of different antenna ports located at the same time-frequency resources may be distinguished from each other by different orthogonal codes (that is, the DMRSs may be multiplexed according to the CDM scheme). In the example of FIG. 7, DMRSs for the antenna port 7 and 8 may be located at resource elements (REs) represented as a DMRS CDM group 1 and the DMRSs can be multiplexed by an orthogonal code. Similarly, in the example of FIG. 7, DMRSs for the antenna port 9 and 10 may be located at resource elements (REs) represented as a DMRS CDM group 2 and the DMRSs can be multiplexed by an orthogonal code.

Figure 8:
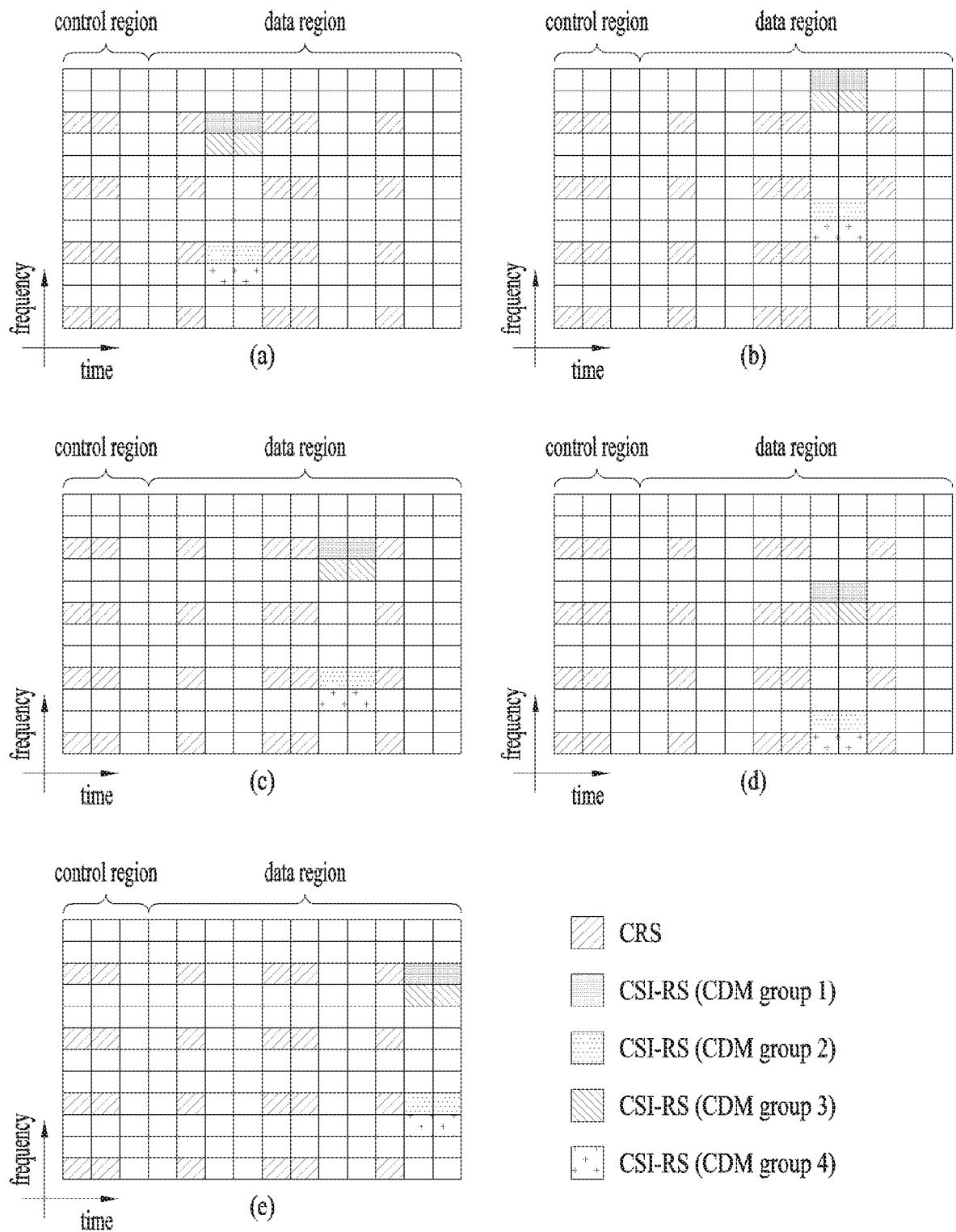
FIG. 8 is a diagram for examples of a CSI-RS pattern.

FIG. 8 is a diagram for examples of a CSI-RS pattern defined in LTE-A system. In FIG. 8, in case of one RB pair (in case of a normal CP, 14 OFDM symbols in a time domain×12 subcarriers in a frequency domain) used for DL data transmission, FIG. 8 shows the locations of resource elements (REs) used for CSI-RS transmission. One CSI-RS pattern shown in FIGS. 8(a) to 8(e) may be used in a certain DL subframe. CSI-RS may be transmitted to 8 antenna ports (antenna port indexes 15, 16, 17, 18, 19, 20, 21 and 22) additionally defined in the LTE-A system. CSI-RSs for different antenna ports are located at different frequency resources (subcarriers) and/or different time resources (OFDM symbols), such that each CSI-RS can be identified (That is, CSI-RSs may be multiplexed according to the FDM and/or TDM scheme(s)). In addition, CSI-RSs of different antenna ports located at the same time-frequency resources may be distinguished from each other by different orthogonal codes (that is, the CSI-RSs may be multiplexed according to the CDM scheme). As shown in FIG. 8(a), CSI-RSs for antenna ports 15 and 16 may be located at REs represented as a CSI-RS CDM Group 1, and may be multiplexed by an orthogonal code. As shown in FIG. 8(a), CSI-RSs for antenna ports 17 and 18 may be located at REs represented as a CSI-RS CDM Group 2, and may be multiplexed by an orthogonal code. As shown in FIG. 8(a), CSI-RSs for antenna ports 19 and 20 may be located at REs represented as a CSI-RS CDM Group 3, and may be multiplexed by an orthogonal code. As shown in FIG. 8(a), CSI-RSs for antenna ports 21 and 22 may be located at REs represented as a CSI-RS CDM Group 4, and may be multiplexed by an orthogonal code. The same principles described in FIG. 8(a) may be applied to FIGS. 8(b) to 8(e).

RS patterns shown in FIGS. 6 to 8 are disclosed only for illustrative purposes, and the scope or spirit of the present invention are not limited only to a specific RS pattern. That is, even in the case in which RS patterns different from those of FIGS. 6 to 8 are defined and used, various embodiments of the present invention can also be equally applied thereto without difficulty.

CSI-RS Configuration

Among a plurality of CSI-RSs and a plurality of IMRs set to a UE, one CSI process can be defined in a manner of associating a CSI-RS resource for measuring a signal with an interference measurement resource (IMR) for measuring interference. A UE feedbacks CSI information induced from CSI processes different from each other to a network (e.g., base station) with an independent period and a subframe offset.

In particular, each CSI process has an independent CSI feedback configuration. The base station can inform the UE of the CS-RS resource, the IMR resource association information and the CSI feedback configuration via higher layer signaling. For example, assume that three CSI processes shown in Table 1 are set to the UE.

TABLE 1

| CSI Process | Signal Measurement Resource (SMR) | IMR |
|---|---|---|
| CSI process 0 | CSI-RS 0 | IMR 0 |
| CSI process 1 | CSI-RS 1 | IMR 1 |
| CSI process 2 | CSI-RS 0 | IMR 2 |

In Table 1, a CSI-RS 0 and a CSI-RS 1 indicate a CSI-RS received from a cell 1 corresponding to a serving cell of a UE and a CSI-RS received from a cell 2 corresponding to a neighbor cell participating in cooperation, respectively. IMRs set to each of the CSI processes shown in Table 1 are shown in Table 2.

TABLE 2

| IMR | eNB 1 | eNB 2 |
|---|---|---|
| IMR 0 | Muting | Data transmission |
| IMR 1 | Data transmission | Muting |
| IMR 2 | Muting | Muting |

A cell 1 performs muting in an IMR 0 and a cell 2 performs data transmission in the IMR 0. A UE is configured to measure interference from other cells except the cell 1 in the IMR 0. Similarly, the cell 2 performs muting in an IMR 1 and the cell 1 performs data transmission in the IMR 1. The UE is configured to measure interference from other cells except the cell 2 in the IMR 1. The cell 1 and the cell 2 perform muting in an IMR 2 and the UE is configured to measure interference from other cells except the cell 1 and the cell 2 in the IMR 2.

Hence, as shown in Table 1 and Table 2, if data is received from the cell 1, CSI information of the CSI process 0 indicates optimized RI, PMI and CQI information. If data is received from the cell 2, CSI information of the CSI process 1 indicates optimized RI, PMI and CQI information. If data is received from the cell 1 and there is no interference from the cell 2, CSI information of the CSI process 2 indicates optimized RI, PMI and CQI information.

It is preferable for a plurality of CSI processes set to a UE to share values subordinate to each other. For example, in case of joint transmission performed by the cell 1 and the cell 2, if a CSI process 1 considering a channel of the cell 1 as a signal part and a CSI process 2 considering a channel of the cell 2 as a signal part are set to a UE, it is able to easily perform JT scheduling only when ranks of the CSI process 1 and the CSI process 2 and a selected subband index are identical to each other.

A period or a pattern of transmitting a CSI-RS can be configured by a base station. In order to measure the CSI-RS, a UE should be aware of CSI-RS configuration of each CSI-RS antenna port of a cell to which the UE belongs thereto. The CSI-RS configuration can include a DL subframe index in which the CSI-RS is transmitted, time-frequency location of a CSI-RS resource element (RE) in a transmission subframe (e.g., the CSI-RS patterns shown in FIGS. 8(a) to 8(e)) and a CSI-RS sequence (a sequence used for a CSI-RS usage, the sequence is pseudo-randomly generated according to a prescribed rule based on a slot number, a cell ID, a CP length and the like), etc. In particular, a plurality of CSI-RS configurations can be used by a random (given) base station and the base station can inform a UE(s) in a cell of a CSI-RS configuration to be used for the UE(s).

Since it is necessary to identify a CSI-RS for each antenna port, resources to which the CSI-RS for each antenna port is transmitted should be orthogonal to each other. As mentioned earlier with reference to FIG. 8, the CSI-RS for each antenna port can be multiplexed by the FDM, the TDM and/or the CDM scheme using an orthogonal frequency resource, an orthogonal time resource and/or an orthogonal code resource.

When the base station informs the UEs in a cell of information on a CSI-RS (CSI-RS configuration), it is necessary for the base station to preferentially inform the UEs of information on time-frequency to which the CSI-RS for each antenna port is mapped. Specifically, information on time can include numbers of subframes in which a CSI-RS is transmitted, a period of transmitting a CSI-RS, a subframe offset of transmitting a CSI-RS, an OFDM symbol number in which a CSI-RS resource element (RE) of a specific antenna is transmitted, etc. Information on frequency can include a frequency space of transmitting a CSI-RS resource element (RE) of a specific antenna, an RE offset on a frequency axis, a shift value, etc.

Figure 9:
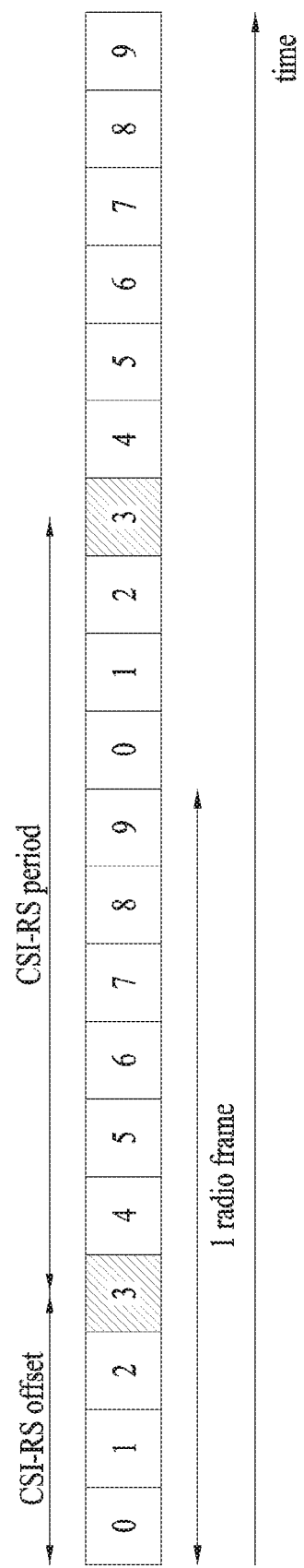
FIG. 9 is a diagram for explaining an example of a scheme of periodically transmitting a CSI-RS.

FIG. 9 is a diagram for explaining an example of a scheme of periodically transmitting a CSI-RS. A CSI-RS can be periodically transmitted with a period of an integer multiple of a subframe (e.g., 5-subframe period, 10-subframe period, 20-subframe period, 40-subframe period or 80-subframe period).

FIG. 9 shows a radio frame configured by 10 subframes (subframe number 0 to 9). In FIG. 9, for example, a transmission period of a CSI-RS of a base station corresponds to 10 ms (i.e., 10 subframes) and a CSI-RS transmission offset corresponds to 3. The offset value may vary depending on a base station to make CSI-RSs of many cells to be evenly distributed in time domain. If a CSI-RS is transmitted with a period of 10 ms, an offset value may have one selected from among 0 to 9. Similarly, if a CSI-RS is transmitted with a period of 5 ms, an offset value may have one selected from among 0 to 4. If a CSI-RS is transmitted with a period of 20 ms, an offset value may have one selected from among 0 to 19. If a CSI-RS is transmitted with a period of 40 ms, an offset value may have one selected from among 0 to 39. If a CSI-RS is transmitted with a period of 80 ms, an offset value may have one selected from among 0 to 79. The offset value corresponds to a value of a subframe in which CSI-RS transmission starts by a base station transmitting a CSI-RS with a prescribed period. If the base station informs a UE of a transmission period of a CSI-RS and an offset value, the UE is able to receive the CSI-RS of the base station at a corresponding subframe position using the transmission period and the offset value. The UE measures a channel through the received CSI-RS and may be then able to report such information as a CQI, a PMI and/or an RI (rank indicator) to the base station. In the present disclosure, the CQI, the PMI and/or the RI can be commonly referred to as CQI (or CSI) except a case of individually explaining the CQI, the PMI and/or the RI. And, the CSI-RS transmission period and the offset can be separately designated according to a CSI-RS configuration.

Figure 10:
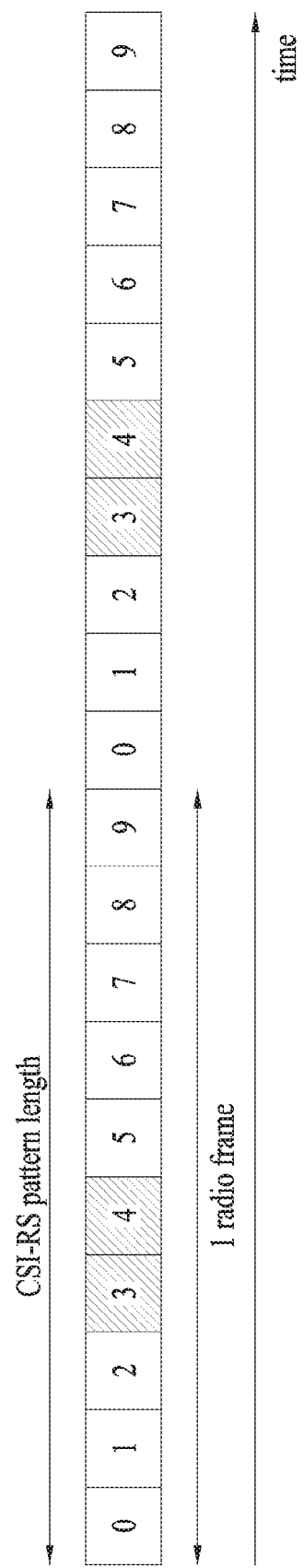
FIG. 10 is a diagram for explaining an example of a scheme of aperiodically transmitting a CSI-RS.

FIG. 10 is a diagram for explaining an example of a scheme of aperiodically transmitting a CSI-RS. In FIG. 10, for example, one radio frame is configured by 10 subframes (subframe number 0 to 9). As shown in FIG. 10, a subframe in which a CSI-RS is transmitted can be represented as a specific pattern. For example, a CSI-RS transmission pattern can be configured by a 10-subframe unit and whether to transmit a CSI-RS can be indicated by a 1-bit indicator in each subframe. An example of FIG. 10 shows a pattern of transmitting a CSI-RS in a subframe index 3 and 4 among 10 subframes (subframe index 0 to 9). The indicator can be provided to a UE via higher layer signaling.

As mentioned in the foregoing description, configuration of CSI-RS transmission can be variously configured. In order to make a UE properly receive a CSI-RS and perform channel measurement, it is necessary for a base station to inform the UE of CSI-RS configuration. Embodiments of the present invention for informing a UE of CSI-RS configuration are explained in the following.

Method of Indicating CSI-RS Configuration

In general, a base station is able to inform a UE of CSI-RS configuration by one of two schemes in the following.

A first scheme is a scheme that a base station broadcasts information on CSI-RS configuration to UEs using dynamic broadcast channel (DBCH) signaling.

In a legacy LTE system, when contents on system information are informed to UEs, the information is transmitted to the UEs via a BCH (broadcasting channel). Yet, if the contents are too much and the BCH is unable to carry all of the contents, the base station transmits the system information using a scheme used for transmitting a general downlink data. And, PDCCH CRC of corresponding data is transmitted in a manner of being masked using SI-RNTI, i.e., system information RNTI, instead of a specific UE ID (e.g., C-RNTI). In this case, actual system information is transmitted to a PDSCH region together with a general unicast data. By doing so, all UEs in a cell decode PDCCH using the SI-RNTI, decode PDSCH indicated by the corresponding PDCCH and may be then able to obtain the system information. This sort of broadcasting scheme may be referred to as a DBCH (dynamic BCH) to differentiate it from a general broadcasting scheme, i.e., PBCH (physical BCH).

Meanwhile, system information broadcasted in a legacy LTE system can be divided into two types. One is a master information block (MIB) transmitted on the PBCH and another one is a system information block (SIB) transmitted on a PDSCH region in a manner of being multiplexed with a general unicast data. In the legacy LTE system, since informations transmitted with an SIB type 1 to an SIB type 8 (SIB1 to SIB8) are already defined, it may be able to define a new SIB type to transmit information on a CSI-RS configuration corresponding to new system information not defined in the legacy SIB types. For example, it may be able to define SIB9 or SIB10 and the base station can inform UEs within a cell of the information on the CSI-RS configuration via the SIB9 or the SIB10 using a DBCH scheme.

A second scheme is a scheme that a base station informs each UE of information on CSI-RS configuration using RRC (radio resource control) signaling. In particular, the information on the CSI-RS can be provided to each of the UEs within a cell using dedicated RRC signaling. For example, in the course of establishing a connection with the base station via an initial access or handover of a UE, the base station can inform the UE of the CSI-RS configuration via RRC signaling. Or, when the base station transmits an RRC signaling message, which requires channel status feedback based on CSI-RS measurement, to the UE, the base station can inform the UE of the CSI-RS configuration via the RRC signaling message.

Indication of CSI-RS Configuration

A random base station may use a plurality of CSI-RS configurations and the base station can transmit a CSI-RS according to each of a plurality of the CSI-RS configurations to a UE in a predetermined subframe. In this case, the base station informs the UE of a plurality of the CSI-RS configurations and may be able to inform the UE of a CSI-RS to be used for measuring a channel state for making a feedback on a CQI (channel quality information) or CSI (channel state information).

Embodiments for a base station to indicate a CSI-RS configuration to be used in a UE and a CSI-RS to be used for measuring a channel are explained in the following.

Figure 11:
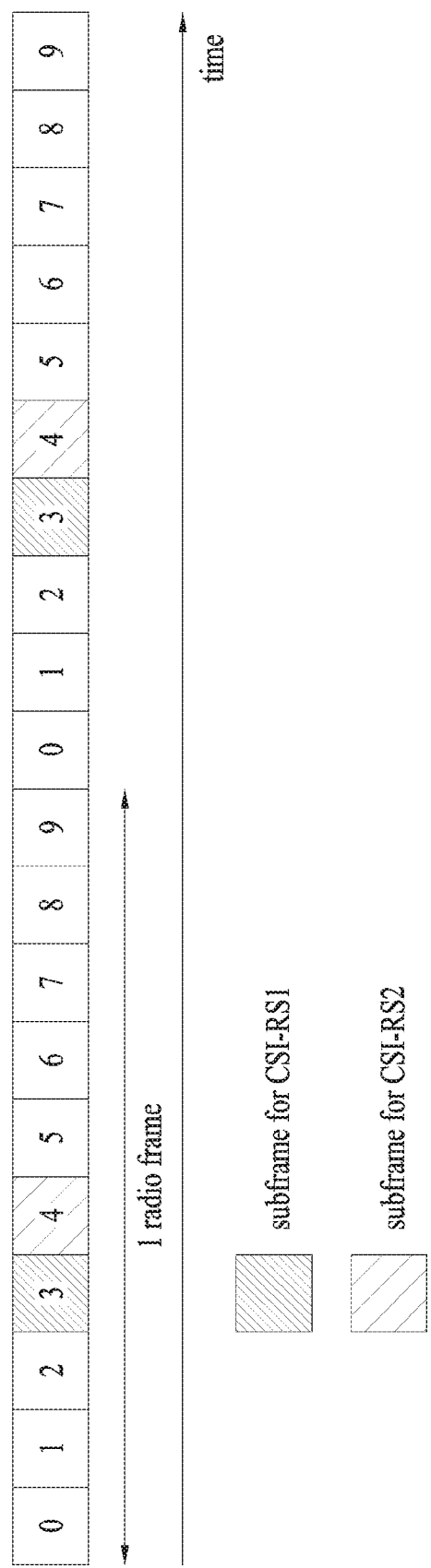
FIG. 11 is a diagram for explaining an example of using two CSI-RS configurations.

FIG. 11 is a diagram for explaining an example of using two CSI-RS configurations. In FIG. 11, for example, one radio frame is configured by 10 subframes (subframe number 0 to 9). In FIG. 11, in case of a first CSI-RS configuration, i.e., a CSI-RS1, a transmission period of a CSI-RS is 10 ms and a transmission offset of a CSI-RS is 3. In FIG. 11, in case of a second CSI-RS configuration, i.e., a CSI-RS2, a transmission period of a CSI-RS is 10 ms and a transmission offset of a CSI-RS is 4. A base station informs a UE of information on two CSI-RS configurations and may be able to inform the UE of a CSI-RS configuration to be used for CQI (or CSI) feedback among the two CSI-RS configurations.

If the base station asks the UE to make a CQI feedback on a specific CSI-RS configuration, the UE can perform channel state measurement using a CSI-RS belonging to the CSI-RS configuration only. Specifically, a channel state is determined based on CSI-RS reception quality, an amount of noise/interference and a function of a correlation coefficient. In this case, the CSI-RS reception quality is measured using the CSI-RS belonging to the CSI-RS configuration only. In order to measure the amount of noise/interference and the correlation coefficient (e.g., an interference covariance matrix indicating interference direction, etc.), measurement can be performed in a subframe in which the CSI-RS is transmitted or a subframe designated in advance. For example, in the embodiment of FIG. 11, if the base station asks the UE to make a feedback on the first CSI-RS configuration (CSI-RS1), the UE measures reception quality using a CSI-RS transmitted in a fourth subframe (a subframe index 3) of a radio frame and the UE can be separately designated to use an add number subframe to measure the amount of noise/interference and the correlation coefficient. Or, it is able to designate the UE to measure the CSI-RS reception quality, the amount of noise/interference and the correlation coefficient in a specific single subframe (e.g., a subframe index 3) only.

For example, reception signal quality measured using a CSI-RS can be simply represented by SINR (signal-to-interference plus noise ratio) as S/(I+N) (in this case, S corresponds to strength of a reception signal, I corresponds to an amount of interference and N corresponds to an amount of noise). The S can be measured through a CSI-RS in a subframe including the CSI-RS in a subframe including a signal transmitted to a UE. Since the I and the N change according to an amount of interference received from a neighbor cell, direction of a signal received from a neighbor cell, and the like, the I and the N can be measured by an SRS transmitted in a subframe in which the S is measured or a separately designated subframe, etc.

In this case, the amount of noise/interference and the correlation coefficient can be measured in a resource element (RE) in which a CRS belonging to a corresponding subframe or a CSI-RS is transmitted. Or, in order to easily measure noise/interference, the noise/interference can be measured through a configured null RE. In order to measure noise/interference in a CRS or CSI-RS RE, a UE preferentially recovers a CRS or a CSI-RS and subtracts a result of the recovery from a reception signal to make a noise and interference signal to be remained only. By doing so, the UE is able to obtain statistics of noise/interference from the remained noise and the interference signal. A null RE may correspond to an empty RE (i.e., transmission power is 0 (zero)) in which no signal is transmitted by a base station. The null RE makes other base stations except the corresponding base station easily measure a signal. In order to measure an amount of noise/interference, it may use all of a CRS RE, a CSI-RS RE and a null RE. Or, a base station may designate REs to be used for measuring noise/interference for a UE. This is because it is necessary to properly designate an RE to be used for measuring noise/interference measured by the UE according to whether a signal of a neighbor cell transmitted to the RE corresponds to a data signal or a control signal. Since the signal of the neighbor cell transmitted to the RE varies according to whether or not synchronization between cells is matched, a CRS configuration, a CSI-RS configuration and the like, the base station identifies the signal of the neighbor cell and may be able to designate an RE in which measurement is to be performed for the UE. In particular, the base station can designate the UE to measure noise/interference using all or a part of the CRS RE, the CSI-RS RE and the null RE.

For example, the base station may use a plurality of CSI-RS configurations and may be able to inform the UE of a CSI-RS configuration to be used for CQI feedback and a null RE position while informing the UE of one or more CSI-RS configurations. In order to distinguish the CSI-RS configuration to be used for CQI feedback by the UE from a null RE transmitted by zero transmission power, the CSI-RS configuration to be used for CQI feedback by the UE may correspond to a CSI-RS configuration transmitted by non-zero transmission power. For example, if the base station informs the UE of a CSI-RS configuration in which the UE performs channel measurement, the UE can assume that a CSI-RS is transmitted by non-zero transmission power in the CSI-RS configuration. In addition, if the base station informs the UE of a CSI-RS configuration transmitted by zero transmission power (i.e., null RE position), the UE can assume that an RE position of the CSI-RS configuration corresponds to zero transmission power. In other word, when the base station informs the UE of a CSI-RS configuration of non-zero transmission power, if there exists a CSI-RS configuration of zero transmission power, the base station can inform the UE of a corresponding null RE position.

As a modified example of the method of indicating a CSI-RS configuration, the base station informs the UE of a plurality of CSI-RS configurations and may be able to inform the UE of all or a part of CSI-RS configurations to be used for CQI feedback among a plurality of the CSI-RS configurations. Hence, having received a request for CQI feedback on a plurality of the CSI-RS configurations, the UE measures a CQI using a CSI-RS corresponding to each CSI-RS configuration and may be then able to transmit a plurality of CQI information to the base station.

Or, in order to make the UE transmit a CQI for each of a plurality of the CSI-RS configurations, the base station can designate an uplink resource, which is necessary for the UE to transmit the CQI, in advance according to each CSI-RS configuration. Information on the uplink resource designation can be provided to the UE in advance via RRC signaling.

Or, the base station can dynamically trigger the UE to transmit a CQI for each of a plurality of CSI-RS configurations to the base station. Dynamic triggering of CQI transmission can be performed via PDCCH. It may inform the UE of a CSI-RS configuration for which a CQI is to be measured via PDCCH. Having received the PDCCH, the UE can feedback a CQI measurement result measured for the CSI-RS configuration designated by the PDCCH to the base station.

A transmission timing of a CSI-RS corresponding to each of a plurality of the CSI-RS configurations can be designated to be transmitted in a different subframe or an identical subframe. If CSI-RSs according to CSI-RS configurations different from each other are designated to be transmitted in an identical subframe, it may be necessary to distinguish the CSI-RSs from each other. In order to distinguish the CSI- RSs according to the CSI-RS configurations different from each other, it may be able to differently apply at least one selected from the group consisting of a time resource, a frequency resource and a code resource of CSI-RS transmission. For example, an RE position in which a CSI-RS is transmitted can be differently designated in a subframe according to a CSI-RS configuration (e.g., a CSI-RS according to one CSI-RS configuration is designated to be transmitted in an RE position shown in FIG. 8 (*a*) and a CSI-RS according to another CSI-RS configuration is designated to be transmitted in an RE position shown in FIG. 8 (*b*)) (distinction using a time and frequency resource). Or, if CSI-RSs according to CSI-RS configurations different from each other are transmitted in an identical RE position, the CSI-RSs can be distinguished from each other by differently using a CSI-RS scrambling code in the CSI-RS configurations different from each other (distinction using a code resource).

Quasi Co-Located (QC)

A UE can receive data from a plurality of transmission points (TPs) (e.g., a TP1 and a TP2). Hence, the UE is able to transmit channel state information on a plurality of the TPs. In this case, RSs can also be transmitted to the UE from a plurality of the TPs. In this case, if it is able to share properties for channel estimation from RS ports different from each other of TPs different from each other, it may be able to reduce load and complexity of reception processing of the UE. Moreover, if it is able to share properties for channel estimation from RS ports different from each other of an identical TP between the RS ports, it may be able to reduce load and complexity of reception processing of the UE. Hence, LTE-A system proposes a method of sharing properties for channel estimation between RS ports.

For channel estimation between RS ports, LTE-A system has introduced such a concept as "quasi co-located (QLC)". For example, if two antenna ports are quasi co-located (QC), the UE may assume that large-scale properties of the signal received from the first antenna port can be inferred from the signal received from the other antenna port". In this case, the large-scale properties can include at least one selected from the group consisting of delay spread, Doppler spread, Doppler shift, average gain and average delay. In the following, the quasi co-located is simply referred to as QCL.

In particular, if two antenna ports are QCL, it may indicate that large-scale properties of a radio channel received from one antenna port are identical to large-scale properties of a radio channel received from another antenna port. If antenna ports transmitting RSs different from each other are QCL, large-scale properties of a radio channel received from one antenna port of a type can be replaced with large-scale properties of a radio channel received from one antenna port of a different type.

According to the aforementioned QCL concept, a UE is unable to assume large-scale channel properties identical to each other between radio channels received from non-QCL (NQC) antenna ports. In particular, in this case, a UE should perform an independent processing according to each configured non-QCL antenna port to obtain timing acquisition and tracking, frequency offset estimation and compensation, delay estimation, and Doppler estimation and the like.

A UE can perform operations in the following between antenna ports capable of assuming QCL. First of all, the UE can use delay spread, Doppler spectrum, Doppler spread estimation result for a radio channel received from an antenna port when a channel is estimated for a radio channel received from a different antenna port. Secondly, regarding frequency shift and received timing, after time synchronization and frequency synchronization for a single antenna port are performed, the UE can apply identical synchronization to demodulation of a different antenna port. Thirdly, regarding average received power, the UE can average RSRP (reference signal received power) measurements for over two or more antenna ports.

If a UE receives a DMRS-based DL-related DCI format via a control channel (PDCCH or EPDCCH), the UE performs channel estimation for a corresponding PDSCH via a DM-RS sequence and performs data demodulation. If DMRS port configuration received from a DL scheduling grant is capable of being QCL with a CRS port, the UE can apply the large-scale channel properties estimation estimated from the CRS port as it is in case of estimating a channel via the DMRS port. This is because a CRS corresponds to a reference signal broadcasted in every subframe with relatively high density over a whole band, the estimation on the large-scale channel properties can be more stably obtained from the CRS. On the contrary, since a DMRS is UE-specifically transmitted for a specific scheduled RB and a precoding matrix, which is used by a base station for transmission, may vary according to a PRG unit, an effective channel received by the UE may vary according to the PRG unit. Hence, if a DMRS is used for estimating the large-scale channel properties of a radio channel over a wide band, performance degradation may occur. In case of a CSI-RS, since the CSI-RS has a relatively long transmission period and a relatively low density, if the CSI-RS is used for estimating the large-scale channel properties of the radio channel, performance degradation may occur.

In particular, QCL assumption between antenna ports can be utilized for receiving various DL reference signals, estimating a channel, reporting a channel state and the like.

MU-MIMO-Related Downlink Control Information (DCI)

Table 3 shows a 3-bit DCI field for a DMRS port, a layer, and nSCID combination supported by a legacy LTE system.

TABLE 3

| 1 codeword: Codeword 0 enable Codeword 1 disable | | 2 codeword: Codeword 0 enable Codeword 1 enable | |
|---|---|---|---|
| Value | Message | Value | Message |
| 0 | 1 layer, port 7, SCID = 0 | 0 | 2 layer, port 7, 8, SCID = 0 |
| 1 | 1 layer, port 7, SCID = 1 | 1 | 2 layer, port 7, 8, SCID = 1 |
| 2 | 1 layer, port 8, SCID = 0 | 2 | 3 layers, port 7, 8, 9 |
| 3 | 1 layer, port 8, SCID = 1 | 3 | 4 layers, port 7, 8, 9, 10 |
| 4 | (ReTx) 2 layers, port 7, 8 | 4 | 5 layers, port 7~11 |
| 5 | (ReTx) 3 layers, port 7~9 | 5 | 6 layers, port 7~12 |
| 6 | (ReTx) 4 layers, port 7~10 | 6 | 7 layers, port 7~13 |
| 7 | Reservered | 7 | 8 layers, port 7~14 |

Referring to Table 3, two MU-MIMO-related restrictions described in the following exist in LTE system.

First restriction is the maximum number of UEs capable of performing MI-MIMO. In a system appearing prior to Rel-11 that a DMRS is mapped to a PCID (physical cell ID), MU-MIMO can be performed for maximum 4 UEs. Yet, as a DMRS VCID (virtual cell ID) has been introduced to a system appearing after Rel-11, the number of quasi-orthogonal DMRSs capable of being generated and used in a cell is increased. As a result, MU-MIMO can be performed in the number of UEs equal to or greater than 4 using the DMRS VCID.

Second restriction is the number of orthogonal DMRSs capable of being assigned between MU-MIMO layers. Although 4 or more UEs are able to receive MU-MIMO service in a cell by utilizing a quasi-orthogonal DMRS, since it is not an orthogonal DMRS, it is anticipated that channel estimation capability is to be deteriorated. If an orthogonal DMRS is assigned between MU-MIMO layers to enhance DMRS channel estimation accuracy, the number of available MU-MIMO UEs is restricted to 2 in a current LTE specification and the number of layers of each UE is restricted to 1. In particular, a UE can perform MU-MIMO in two cases only described in Table 4 in the following.

TABLE 4

| MU-MIMO Case 1 | | MU-MIMO Case 2 | |
| --- | --- | --- | --- |
| UE1 | 1 layer, port 7, SCID = 0 | UE1 | 1 layer, port 7, SCID = 1 |
| UE2 | 1 layer, port 8, SCID = 0 | UE2 | 1 layer, port 8, SCID = 1 |

In general, in a current LTE system in which two transmission antennas are installed, since MU-MIMO number is restricted to 2 due to the number of antennas, MU-MIMO may operate well under the restriction. However, if a 3D MIMO technology is introduced in the future, a base station will use dozens or several hundreds of transmission antennas and the number of available MU-MIMO UEs will be considerably increased as well as a result of the increase of the transmission antennas. In a situation of having the many numbers of transmission antennas, the aforementioned restrictions may degrade achievable MU-MIMO performance.

In the following, embodiments of the present invention for increasing the number of orthogonal DMRSs capable of being assigned between MU-MIMO UEs from 2 supported by a legacy LTE system to N are explained. As a result, although the number of MU-MIMO UEs increases by three times, each UE can estimate a DMRS channel with no interference between MU-MIMO UEs. The present invention can be efficiently used for supporting a plurality of MU-MIMO UEs in environment that the number of antennas of a base station explosively increases due to 3D-MIMO technology in the future.

Embodiment 1 (Port Swapping)

First embodiment of the present invention relates to a method of using a DMRS port i and a DMRS port j in a manner of swapping the ports.

For example, when a specific UE manages a port 7 and a port 11 in a manner of swapping the ports, a DMRS is received by the port 11 using nSCID 0 or 1 instead of the port 7 in single layer transmission and fifth layer is received using a fixed nSCID 0 and the port 7 instead of the port 11 in 5-layer transmission. In the following embodiment 1-1 and embodiment 1-2, port swapping is explained in more detail.

Embodiment 1-1 (Port Swapping in the Same CDM Group)

According to the related art, a DMRS port is CDM or FDM using a Walsh code. In particular, ports {7, 8, 11, and 13} and ports {9, 10, 12, and 14} are respectively CDM for an identical frequency resource and the two port groups are FDM.

First of all, as a first embodiment, a benefit capable of being obtained by applying port swapping between ports in an identical CDM group is explained in the aspect of MU-MIMO.

Figure 12:
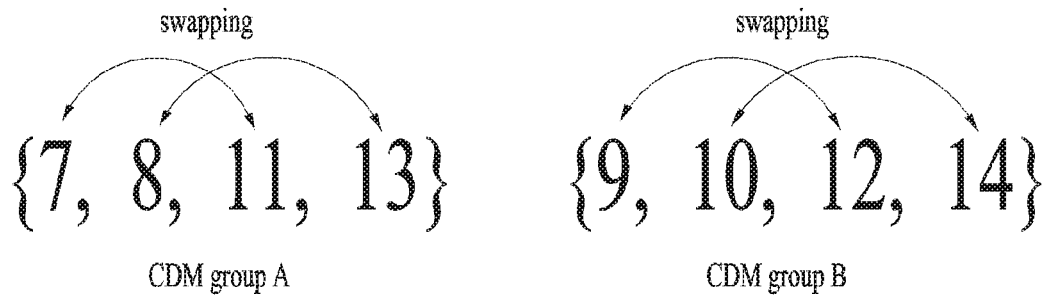
FIG. 12 is a diagram for an example according to embodiment 1-1 of the present invention.

FIG. 12 is a diagram for an example of swapping between ports in an identical CDM group. Referring to FIG. 12, a role of a port is swapped in each pair consisting of (7, 11), (8, 13), (9, 12), (10, 14). For example, if a port 7 and a port 11 are managed in a manner of being swapped, a DMRS is received by the port 11 using nSCID 0 or 1 instead of the port 7 in single layer transmission and fifth layer is received using a fixed nSCID 0 and the port 7 instead of the port 11 in 5-layer transmission.

In order to match port swapping between a base station and a UE, it is necessary to exchange a signal between the base station and the UE. For example, the base station may promise port management with the UE in a manner of turning on/off port swapping by adding 1 bit to a DCI. Although there is one swapping pattern shown in the example of FIG. 12, there may exist a plurality of swapping patterns. In this case, it may be able to indicate port swapping patterns by allocating more bits. If port swapping is semi-statically managed, information on the semi-static port swapping can be indicated via RRC signaling. In embodiment 4-1, signaling schemes shall be explained in more detail.

As shown in FIG. 12, a UE to which port swapping is applied can receive a DMRS in a manner of interpreting a DCI field given to Table 3 as Table 5.

TABLE 5

| 1 codeword: Codeword 0 enable Codeword 1 disable | | 2 codeword: Codeword 0 enable Codeword 1 enable | |
| --- | --- | --- | --- |
| Value | Message | Value | Message |
| 0 | 1 layer, port 11, SCID = 0 | 0 | 2 layer, port 11, 13, SCID = 0 |
| 1 | 1 layer, port 11, SCID = 1 | 1 | 2 layer, port 11, 13, SCID = 1 |
| 2 | 1 layer, port 13, SCID = 0 | 2 | 3 layers, port 11, 13, 12 |
| 3 | 1 layer, port 13, SCID = 1 | 3 | 4 layers, port 11, 13, 12, 14 |
| 4 | (ReTx) 2 layers, port 11, 13 | 4 | 5 layers, port 11, 13, 12, 14, 7 |
| 5 | (ReTx) 3 layers, port 11, 13, 12 | 5 | 6 layers, port 11, 13, 12, 14, 7, 9 |
| 6 | (ReTx) 4 layers, port 11, 13, 12, 14 | 6 | 7 layers, port 11, 13, 12, 14, 7, 9, 8 |
| 7 | Reservered | 7 | 8 layers, port 11, 13, 12, 14, 7, 9, 8, 10 |

If port swapping is applied as FIG. 12, the number of MU-MIMO UEs having an orthogonal DMRS and the number of MU-MIMO layers can be increased. For example, as shown in Table 6 in the following, MU-MIMO can be performed for 4 UEs having an orthogonal DMRS.

TABLE 6

| UE 1 (swapping OFF) | port 7, nSCID = 0, VCID = x |
| UE 2 (swapping OFF) | port 8, nSCID = 0, VCID = x |
| UE 3 (swapping ON) | port 11, nSCID = 0, VCID = x |
| UE 4 (swapping ON) | port 13, nSCID = 0, VCID = x |

As a different example, as shown in Table 7 in the following, MU-MIMO can be performed for 2 UEs having an orthogonal DMRS in a manner of transmitting 2 layers per UE.

TABLE 7

| UE 1 (swapping OFF) | port 7, 8 nSCID = 0, VCID = x |
|---|---|
| UE 2 (swapping ON) | port 11, 13 nSCID = 0, VCID = x |

Embodiment 1-2 (Port Swapping Between Different CDM Groups)

Figure 13:
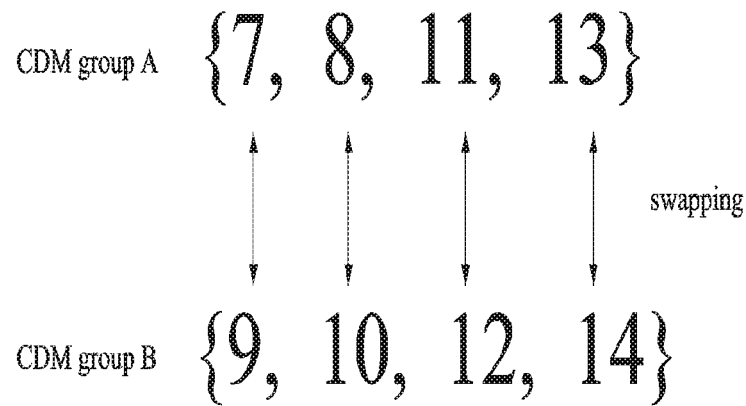
FIG. 13 is a diagram for an example according to embodiment 1-2 of the present invention.

As an embodiment 1-2 of the present invention, as shown in FIG. 13, it may be able to apply port swapping between CDM groups.

As shown in FIG. 13, a UE to which port swapping is applied can receive a DMRS in a manner of interpreting a DCI field given to Table 3 as Table 8.

TABLE 8

| 1 codeword: Codeword 0 enable Codeword 1 disable | | 2 codeword: Codeword 0 enable Codeword 1 enable | |
|---|---|---|---|
| Value | Message | Value | Message |
| 0 | 1 layer, port 9, SCID = 0 | 0 | 2 layer, port 9, 10, SCID = 0 |
| 1 | 1 layer, port 9, SCID = 1 | 1 | 2 layer, port 9, 10, SCID = 1 |
| 2 | 1 layer, port 10, SCID = 0 | 2 | 3 layers, port 9, 10, 7 |
| 3 | 1 layer, port 10, SCID = 1 | 3 | 4 layers, port 7, 8, 9, 10 |
| 4 | (ReTx) 2 layers, port 9, 10 | 4 | 5 layers, port 7, 8, 9 10, 12 |
| 5 | (ReTx) 3 layers, port 9, 10, 7 | 5 | 6 layers, port 7~12 |
| 6 | (ReTx) 4 layers, port 9, 10, 7, 8 | 6 | 7 layers, port 7, 8, 9 10, 12, 14 |
| 7 | Reserved | 7 | 8 layers, port 7~14 |

If port swapping is applied as FIG. 13, the number of MU-MIMO UEs having an orthogonal DMRS and the number of MU-MIMO layers can be increased. For example, as shown in the following, MU-MIMO can be performed for 4 UEs having an orthogonal DMRS.

TABLE 9

| UE 1 (swapping OFF) | port 7, nSCID = 0, VCID = x |
|---|---|
| UE 2 (swapping OFF) | port 8, nSCID = 0, VCID = x |
| UE 3 (swapping ON) | port 9, nSCID = 0, VCID = x |
| UE 4 (swapping ON) | port 10, nSCID = 0, VCID = x |

As a different example, as shown in Table 10 in the following, MU-MIMO can be performed for 2 UEs having an orthogonal DMRS (in a manner of transmitting 2 layers per UE).

TABLE 10

| UE 1 (swapping OFF) | port 7, 8 nSCID = 0, VCID = x |
|---|---|
| UE 2 (swapping ON) | port 9, 10 nSCID = 0, VCID = x |

Embodiment 1-3 (Utilizing Multiple Swapping Patterns)

When a UE is signaled by utilizing the swapping patterns shown in FIGS. 12 and 13 and other various swapping patterns in a cell, the number of MU-MIMO UEs having an orthogonal DMRS can be increased up to 8. For example, as shown in Table 11 in the following, MU-MIMO can be performed among 8 UEs.

TABLE 11

| UE 1 (swapping OFF) | Port 7, nSCID = 0, VCID = x |
|---|---|
| UE 2 (swapping OFF) | Port 8, nSCID = 0, VCID = x |
| UE 3 (swapping pattern ON in FIG. 12) | Port 11, nSCID = 0, VCID = x |
| UE 4 (swapping pattern ON in FIG. 12) | Port 13, nSCID = 0, VCID = x |
| UE 5 (swapping pattern ON in FIG. 13) | Port 9, nSCID = 0, VCID = x |
| UE 6 (swapping pattern ON in FIG. 13) | Port 10, nSCID = 0, VCID = x |
| UE 7 (other swapping pattern ON) | Port 12, nSCID = 0, VCID = x |
| UE 8 (other swapping pattern ON) | Port 14, nSCID = 0, VCID = x |

More generally, a base station can signal 8 DMRS ports and 8 mappings between layers according to a UE (e.g., semi-static signaling in RRC level). For example, the base station signals each UE in a manner of dividing port groups into a port group A capable of being connected with a $1^{st}$ and a $2^{nd}$ layer and a port group B capable of being connected with a $3^{rd}$ to $8^{th}$ layer. Specifically, the port group A and the port group B may indicate {port 11, 13} and {port 9, 10, 7, 12, 8, 14}, respectively. The group A corresponding to a low rank can be randomly connected with layers (i.e., $1^{st}$ and $2^{nd}$ layers) of a mapped layer set in consideration of MU-MIMO scheduling. In particular, the $1^{st}$ layer can be connected with a port 11 or a port 13 and the $2^{nd}$ layer can be connected with the rest of ports except a port connected with the $1^{st}$ layer. The group B is connected with layers of a mapped layer set by one-to-one (1:1). In particular, each of the $3^{rd}$ to $8^{th}$ layer is sequentially mapped to a port 9, 10, 7, 12, 8 and 14 by one-to-one.

Or, the base station maps a port A, B, C, D, E, F, G and H to a port 7, 8, 9, 10, 11, 12, 13, 14 and 15 by one-to-one and the mapping information can be signaled to the UE (e.g., semi-static signaling in an RRC level). The UE interprets the port A, B, C, D, E, F, G and H as Table 12 in the following and interprets the port A, B, C, D, E, F, G and H as port numbers in a manner of transforming the ports according to the mapping information received from the base station.

TABLE 12

| 1 codeword: Codeword 0 enable Codeword 1 disable | | 2 codeword: Codeword 0 enable Codeword 1 enable | |
|---|---|---|---|
| Value | Message | Value | Message |
| 0 | 1 layer, port A, SCID = 0 | 0 | 2 layer, port A, B, SCID = 0 |
| 1 | 1 layer, port A, SCID = 1 | 1 | 2 layer, port A, B, SCID = 1 |
| 2 | 1 layer, port B, SCID = 0 | 2 | 3 layers, port A, B, C |
| 3 | 1 layer, port B, SCID = 1 | 3 | 4 layers, port A, B, C, D |
| 4 | (ReTx) 2 layers, port A, B | 4 | 5 layers, port A, B, C D, E |
| 5 | (ReTx) 3 layers, port A, B, C | 5 | 6 layers, port A, B, C, D, E, F |
| 6 | (ReTx) 4 layers, port A, B, C, D | 6 | 7 layers, port A, B, C D, E, F, G |
| 7 | Reserved | 7 | 8 layers, port A, B, C, D, E, F, G, H |

Embodiment 1-4 (Designing Control Signal for Port Swapping)

In order to match port swapping between a base station and a UE, it is necessary to introduce signaling between the base station and the UE. For example, the base station may promise port management with the UE in a manner of tuning on/off port swapping by adding 1 bit to a DCI. In FIG. 12, although there is one determined swapping pattern, there may exist a plurality of swapping patterns. In this case, it may be able to indicate port swapping patterns in a manner of allocating more bits. When port swapping is semi-statically managed, information on the semi-static port swapping can be indicated via RRC signaling.

First of all, a dynamic indication method can be used for the signaling. As a first example of the dynamic indication method, it may be able to utilize a PQI state.

A PQI field transmitted via a DCI plays a role of notifying QCL information and rate matching information in a CoMP operation. Besides the original purpose, the PQI can be also be utilized for a purpose of signaling port swapping as follows.

If a DPB UE, a CS/CB UE or a non-CoMP UE receives a service equal to or higher than TM 10, an actually used state is limited to a single state among 4 PQI states. This is because a TP transmitting PDSCH is a serving TP only. Hence, in this case, a PQI state can be managed in a manner of mapping a port swapping pattern to the PQI state. For example, 4 PQI states include rate matching information of a serving TP and PQI information of the serving TP as a common value and may have a port swapping pattern different from each other. For example, a pattern 1, 2, 3 and 4 can be defined as no swapping, swapping in FIG. 12, swapping in FIG. 13 and other swapping pattern, respectively.

[FIG. 13]

| | |
|---|---|
| PQI state 1 | Rate matching information of serving TP, PQI information of serving TP + port swapping pattern 1 |
| PQI state 2 | Rate matching information of serving TP, PQI information of serving TP + port swapping pattern 2 |
| PQI state 3 | Rate matching information of serving TP, PQI information of serving TP + port swapping pattern 3 |
| PQI state 4 | Rate matching information of serving TP, PQI information of serving TP + port swapping pattern 4 |

In case of a DPS UE, a TP transmitting PDSCH dynamically selects one from among a plurality of TPs including a serving TP. In this case, some of 4 PQI states is utilized for DPS and the rest of the 4 PQI states can be used for notifying a port swapping pattern. For example, if it is assumed that a PQI state 1, 2 and 3 are utilized for CoMP and the PQI state 1 indicates QCL information and rate matching information on a serving TP, a PQI state 4 can be used for port swapping. In particular, although the PQI state 1 and the PQI state 4 indicate the same QCL information and the rate matching information, the PQI state 1 and the PQI state 4 may notify a swapping patter different from each other. In this case, swapping can be applied only when PDSCH is received from the serving TP.

As a second example of the dynamic indication method, it may use nSCID.

According to a related art, as shown in Table 3, if a reception rank of a UE is low, it may be able to configure two nSCIDs to perform MU-MIMO. Besides the original purpose, it may be able to utilize nSCID for the purpose of signaling port swapping as follows.

If the nSCID correspond to 0 or 1, it may be able to use a swapping pattern different from each other. For example, if the nSCID corresponds to 0, port swapping is off. If the nSCID corresponds to 1, the port swapping pattern shown in FIG. 12 is on. This can be promised in advance between the base station and the UE. In this case, the DCI field shown in Table 3 is changed to DCI field shown in Table 14.

And, a port swapping signal utilizing the nSCID can be UE-specifically defined. In particular, as shown in Table 14, a UE 1 applies the port swapping pattern shown in FIG. 12 to nSCID 1 and a UE 2 applies the swapping pattern shown in FIG. 13 to the nSCID 1. By doing so, it is able to increase the number of orthogonal UE candidates capable of performing MU-MIMO.

TABLE 14

| 1 codeword:<br>Codeword 0 enable<br>Codeword 1 disable | | 2 codeword:<br>Codeword 0 enable<br>Codeword 1 enable | |
|---|---|---|---|
| Value | Message | Value | Message |
| 0 | 1 layer, port 7, SCID = 0 | 0 | 2 layer, port 7, 8, SCID = 0 |
| 1 | 1 layer, port 11, SCID = 1 | 1 | 2 layer, port 11, 13, SCID = 1 |
| 2 | 1 layer, port 8, SCID = 0 | 2 | 3 layers, port 7, 8, 9 |
| 3 | 1 layer, port 13, SCID = 1 | 3 | 4 layers, port 7, 8, 9, 10 |
| 4 | (ReTx) 2 layers, port 7, 8 | 4 | 5 layers, port 7~11 |
| 5 | (ReTx) 3 layers, port 7~9 | 5 | 6 layers, port 7~12 |
| 6 | (ReTx) 4 layers, port 7~10 | 6 | 7 layers, port 7~13 |
| 7 | Reservered | 7 | 8 layers, port 7~14 |

As a third example of the dynamic indication method, it may use an extension of DCI port & layer field.

It is able to additionally indicate a swapped port in a manner of extending a legacy DMRS port & layer field defined in a DCI. For example, in case of considering the swapping shown in FIG. 12, a DCI field corresponding to 4 bits in total can be newly generated and used.

As a fourth example of the dynamic indication method, it may be able to add a new DCI field for a port swapping signal. For example, if there are two port swapping patterns, i.e., swapping ON and swapping OFF, it may indicate by 1 bit signaling and a UE differently interprets a DMRS port & layer field according to a value of the signaling.

As a fifth example of the dynamic indication method, it may be able to use an EPDCCH set.

In particular, signaling can be performed in a manner of tying a port swapping pattern to an EPDCCH set. For example, if a DCI corresponding to PDSCH is detected in a set 0, it is determined as a swapping pattern 1 is used. If a DCI corresponding to PDSCH is detected in a set 1, it is determined as a swapping pattern 2 is used. This can be promised between a base station and a UE in advance.

As a sixth example of the dynamic indication method, it may be able to use a PDCCH search space.

For example, when a DCI is detected in a common search space and when a DCI is detected in a UE-specific search space, it may be able to apply a port swapping pattern different from each other.

Meanwhile, unlike the aforementioned dynamic signaling method, it may be able to use a semi-static signaling method.

As a first example of the semi-static signaling method, it may be able to use a CRNTI.

It is able to signal port swapping by utilizing a CRNTI given to each UE. For example, if there are N number of port swapping, the CRNTI can be respectively mapped to 0 to N−1 resulted from modulo-N calculation. In this case, a UE uses one port swapping pattern unless a new CRNTI is received by making a handover. Yet, in the aspect of a cell, since there are many UEs of which a pattern is different from each other, it may be able to increase the number of orthogonal MU MIMO.

As a second example of the semi-static signaling method, it may be able to use new RRC signaling.

For example, a base station can inform a UE of a port swapping pattern via RRC signaling.

As a third example of the semi-static signaling method, it may be able to apply a port swapping pattern according to a frequency-time resource.

It may be able to turn on/off port swapping according to a frequency-time resource or apply a swapping pattern different from each other. For example, if two subframe sets are generated and a set 0 and a set 1 correspond to an even number subframe and an odd number subframe, respectively, a swapping pattern 1 and a swapping pattern 2 can be applied to the set 0 and the set 1, respectively. A base station can indicate a subframe set and a swapping pattern to a UE via RRC signaling. Or, it may be able to apply a pattern different from each other in a manner of distinguishing an MBSFN subframe from a non MBSFN subframe.

Embodiment 2 (Port Replacement in Case of Low Rank)

According to embodiment 2 of the present invention, it is able to apply a DMRS port i (e.g., port 7/8) used in a low rank (e.g., rank 1/2) in a manner of changing the DMRS port i to a different DMRS port. In the embodiment 1, a method of swapping a port i with a port j is applied. In the embodiment 2, the method is applied to a case that a rank assigned to a UE is low only. The method of the embodiment 2 corresponds to a method of using a port j previously used in a high rank instead of a port i previously used in a low rank.

Figure 14:
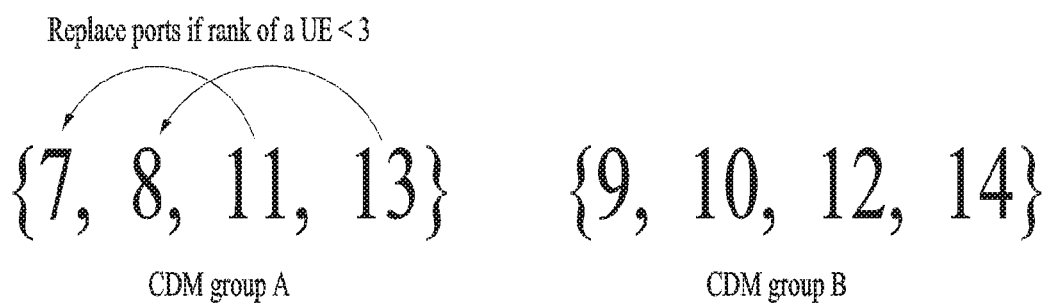
FIG. 14 is a diagram for an example according to embodiment 2 of the present invention.

For example, as shown in FIG. 14, if a rank of a UE is equal to or lower than 2, a port 7/8 can be replaced with a port 11/13.

A UE to which port swapping shown in FIG. 13 is applied receives a DMRS in a manner of interpreting a DCI field given to Table 3 as Table 15.

TABLE 15

| 1 codeword: Codeword 0 enable Codeword 1 disable | | 2 codeword: Codeword 0 enable Codeword 1 enable | |
|---|---|---|---|
| Value | Message | Value | Message |
| 0 | 1 layer, port 11, SCID = 0 | 0 | 2 layer, port 11, 13, SCID = 0 |
| 1 | 1 layer, port 11, SCID = 1 | 1 | 2 layer, port 11, 13, SCID = 1 |
| 2 | 1 layer, port 13, SCID = 0 | 2 | 3 layers, port 7, 8, 9 |
| 3 | 1 layer, port 13, SCID = 1 | 3 | 4 layers, port 7, 8, 9, 10 |
| 4 | (ReTx) 2 layers, port 11, 13 | 4 | 5 layers, port 7~11 |
| 5 | (ReTx) 3 layers, port 7~9 | 5 | 6 layers, port 7~12 |
| 6 | (ReTx) 4 layers, port 7~10 | 6 | 7 layers, port 7~13 |
| 7 | Reservered | 7 | 8 layers, port 7~14 |

Similar to port swapping, port replacement is UE-specifically applied and a replacement pattern can also be differently configured according to a UE. In particular, a port (7, 8) can be replaced with (11, 13), (9, 10) or (12, 14) and a different replacement pattern can be set to each UE. In case of applying various replacement patterns to a UE, it is able to perform orthogonal DMRS-based MU-MIMO for 8 rank-1 UEs by utilizing 8 ports.

The method mentioned earlier in the embodiment 1-4 of the present invention is identically applied to signaling for port replacement and a control signal can be interpreted by replacement instead of swapping. For example, if replacement of Table 15 is covered by extending Table 3, it is able to generate and use a new table through a union of Table 3 and Table 15.

Embodiment 3 (Available Port Addition in Case of Low Rank)

According to embodiment 3 of the present invention, as a simple method of increasing the number of orthogonal MU-MIMO, it may increase the number of ports capable of being used in the port & layer field of Table 3. For example, although a port usable for a rank 1 and 2 of Table 3 is limited to a port 7 and 8, as shown in Table 16 and Table 17, a field is extended to make the rest of fields to be usable. A part of combinations of port+nSCID, which are added to design a more compact field, is eliminated from Table 3 and it may be able to use the rest of the combinations only. For example, it may be able to restrict an added port to use nSCID 1 only among nSCID 1 and nSCID 0. By doing so, a compact field can be designed. Referring to Table 17, a base station can inform a UE of a length of OCC used in a port 7 and 8. In case of values 0, 1, 2 and 3 for 1 codeword, similar to a legacy scheme, the OCC lengths of the port 7 and 8 are interpreted as 2. In case of values 8, 9, 10 and 11 for 1 codeword, the OCC lengths of the port 7 and 8 are interpreted as 4. Similarly, in order to make the OCC length to be interpreted as 4 when retransmission is made using the port 7 and 8, a value 16 for 1 codeword is added as well. OCC lengths for ports of values 0 to 7 are interpreted in a manner of being identical to a legacy LTE system and OCC values for port 11 and 17 of a newly added value are assumed as 4.

TABLE 16

| 1 codeword: Codeword 0 enable Codeword 1 disable | | 2 codeword: Codeword 0 enable Codeword 1 enable | |
|---|---|---|---|
| Value | Message | Value | Message |
| 0 | 1 layer, port 7, SCID = 0 | 0 | 2 layer, port 7, 8, SCID = 0 |
| 1 | 1 layer, port 7, SCID = 1 | 1 | 2 laser, port 7, 8, SCID = 1 |
| 2 | 1 layer, port 8, SCID = 0 | 2 | 3 layers, port 7, 8, 9 |
| 3 | 1 layer, port 8, SCID = 1 | 3 | 4 layers, port 7, 8, 9, 10 |
| 4 | (ReTx) 2 layers, port 7, 8 | 4 | 5 layers, port 7~11 |
| 5 | (ReTx) 3 layers, port 7~9 | 5 | 6 layers, port 7~12 |
| 6 | (ReTx) 1 layers, port 7~10 | 6 | 7 layers, port 7~13 |
| 7 | Reserved | 7 | 8 layers, port 7~14 |
| 8 | 1 layer, port 11, SCID = 0 | 8 | 2 layer, port 9, 10, SCID = 0 |
| 9 | 1 layer, port 11, SCID = 1 | 9 | 2 layer, port 9, 10, SCID = 1 |
| 10 | 1 layer, port 13, SCID = 0 | 10 | 2 layer, port 11, 13, SCID = 0 |
| 11 | 1 layer, port 13, SCID = 1 | 11 | 2 layer, port 11, 13, SCID = 1 |

TABLE 16-continued

| | 1 codeword:<br>Codeword 0 enable<br>Codeword 1 disable | | 2 codeword:<br>Codeword 0 enable<br>Codeword 1 enable |
|---|---|---|---|
| Value | Message | Value | Message |
| 12 | 1 layer, port 10, SCID = 0 | 12 | 2 layer, port 12, 14, SCID = 0 |
| 13 | 1 layer, port 10, SCID = 1 | 13 | 2 layer, port 12, 14, SCID = 1 |
| 14 | 1 layer, port 9, SCID = 0 | 14 | reserved |
| 15 | 1 layer, port 9, SCID = 1 | 15 | Reserved |
| 16 | 1 layer, port 12, SCID = 0 | 16 | Reserved |
| 17 | 1 layer, port 12, SCID = 1 | 17 | Reserved |
| 18 | 1 layer, port 14, SCID = 0 | 18 | Reserved |
| 19 | 1 layer, port 14, SCID = 1 | 19 | Reserved |

TABLE 17

| | 1 codeword:<br>Codeword 0 enable<br>Codeword 1 disable | | 2 codeword:<br>Codeword 0 enable<br>Codeword 1 enable |
|---|---|---|---|
| Value | Message | Value | Message |
| 0 | 1 layer, port 7, SCID = 0 | 0 | 2 layer, port 7, 8, SCID = 0 |
| 1 | 1 layer, port 7, SCID = 1 | 1 | 2 layer, port 7, 8, SCID = 1 |
| 2 | 1 layer, port 8, SCID = 0 | 2 | 3 layers, port 7, 8, 9 |
| 3 | 1 layer, port 8, SCID = 1 | 3 | 4 layers, port 7, 8, 9, 10 |
| 4 | (ReTx) 2 layers, port 7, 8 | 4 | 5 layers, port 7~11 |
| 5 | (ReTx) 3 layers, port 7~9 | 5 | 6 layers, port 7~12 |
| 6 | (ReTx) 4 layers, port 7~10 | 6 | 7 layers, port 7~13 |
| 7 | Reserved | 7 | 8 layers, port 7~14 |
| 8 | 1 layer, port 7, SCID = 0 (with OCC length = 4) | 8 | 2 layer, port 11, 13, SCID = 0 |
| 9 | 1 layer, port 7, SCID = 1 (with OCC length = 4) | 9 | 2 layer, port 11, 13, SCID = 1 |
| 10 | 1 layer, port 8, SCID = 0 (with OCC length = 4) | 10 | reserved |
| 11 | 1 layer, port 8, SCID = 1 (with OCC length = 4) | 11 | reserved |
| 12 | 1 layer, port 11, SCID = 0 | 12 | reserved |
| 13 | 1 layer, port 11, SCID = 1 | 13 | reserved |
| 14 | 1 layer, port 13, SCID = 0 | 14 | reserved |
| 15 | 1 layer, port 13, SCID = 1 | 15 | Reserved |
| 16 | (ReTx) 2 layers, port 7, 8 (with OCC length = 4) | 16 | Reserved |
| 17 | (ReTx) 2 layers, port 11, 13 | 17 | Reserved |
| 18 | | 18 | Reserved |
| 19 | | 19 | Reserved |

Embodiment 4 (OCC Length Indication)

In the aspect of a UE, if a rank is equal to or lower than 4, OCC (orthogonal cover code) length is set to 2 in a legacy LTE system. If the length is 2, it is able to obtain sufficient DMRS channel estimation capability in environment that channel fading is robust in a time axis (OFDM symbol level). However, if a rank is higher than 4, since three or more ports are CDM to an identical RE, the OCC length is increased to 4.

In order to properly operate the methods mentioned earlier in the embodiment 1 and the embodiment 2, unlike a legacy method, the OCC length should be changed to 4 in a low rank as well. The OCC length can be indicated in various ways. As a simplest method, the OCC length can be differently managed according to a TM (transmission mode). For example, in case of a specific TM (e.g., TM 11 for 3D MIMO) in LTE system, the OCC length is managed by 4 and the OCC length can be identically managed by a legacy length in the rest of TMs. Or, the OCC length can be managed by 4 for a specific DCI format (e.g., DCI format 2E for 3D MIMO) only.

Or, a new field can be generated in a DCI to indicate the OCC length or it is able to signal port & layer field in a manner of jointly encoding the OCC length as well. Or, the signaling method mentioned earlier in the embodiment 1-4 can be applied to indicate the OCC length. In particular, the OCC length can be managed in a manner of mapping the OCC length to a PQI state or tying the OCC length to nSCID, EPDCCH or the like.

Embodiment 5 (Method of Changing Walsh Code)

The DMRS port swapping, the port replacement and the port addition of the aforementioned embodiments are all described in the aspect of a port. Embodiment 5 of the present invention explains a method of swapping, replacing and adding a Walsh code in which each port is CDM while a port index is identically maintained.

In particular, Walsh code swapping corresponds to a concept of swapping a Walsh code of a port i with a Walsh code of a port j. In particular, if code swapping is turned on, a base station and a UE interpret a port according to Table 3 and swap the Walsh code of the port i with the Walsh code of the port j in accordance with a given code swapping pattern. Walsh code replacement corresponds to a concept of using the Walsh code of the port j instead of the Walsh code of the port i in a low rank.

As shown in FIG. 14, the Wash code replacement does not replace a port itself in a specific rank but replace a legacy Walsh code of a port with a Walsh code of a different port or a third Walsh code. In this case, as shown in Table 15, a UE does not put an interpretation on a replaced port but put an interpretation on a port using Table 3. The UE replaces and uses a Walsh code of a port only.

According to the Walsh code addition, a Walsh code is not fixed by one with respect to the port i and it is able to select one from among a plurality of Walsh codes. A plurality of the Walsh codes can be promised in advance between a base station and a UE via signaling. Since a port and a Walsh code are fixedly mapped to each other in advance, a Walsh code is not selected in Table 3. Yet, in case of the Walsh code addition scheme, it is necessary to make a different Walsh code except a fixed Walsh code to be selected.

Signaling for the Walsh code swapping, the Walsh code replacement and the Walsh code addition can be used in a manner of straight forwardly extending the signaling for the DMRS port swapping, the DMRS port replacement and the DMRS port addition.

Figure 15:
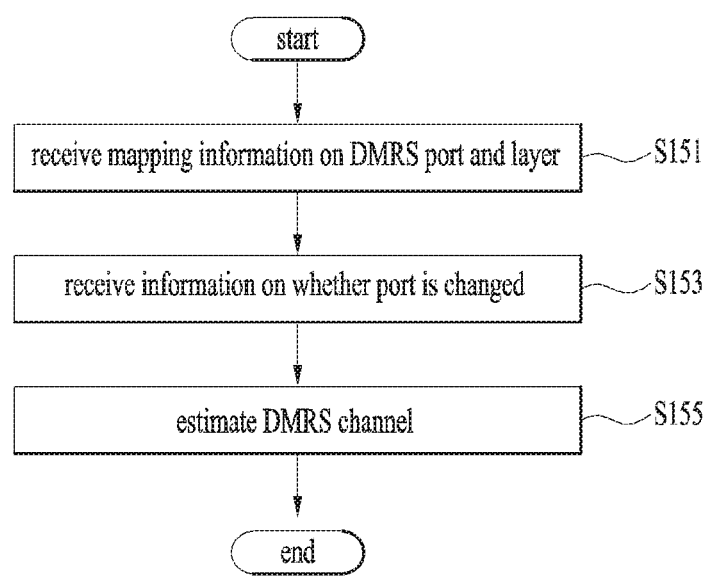
FIG. 15 is a flowchart for an example of embodiment of the present invention.

FIG. 15 is a flowchart for an example of embodiment of the present invention.

First of all, a UE receives mapping information on a port and a layer of a data demodulation reference signal (DMRS) [S151]. Subsequently, the UE receives change information indicating whether or not the port of the DMRS is changed [S153]. Subsequently, the UE determines a change of the port information based on the indicator and estimates a channel of the DMRS [S155]. In this case, since detail explanation on a case of changing a DMRS port is identical to the aforementioned embodiments 1 to 5, details are omitted at this time.

Figure 16:
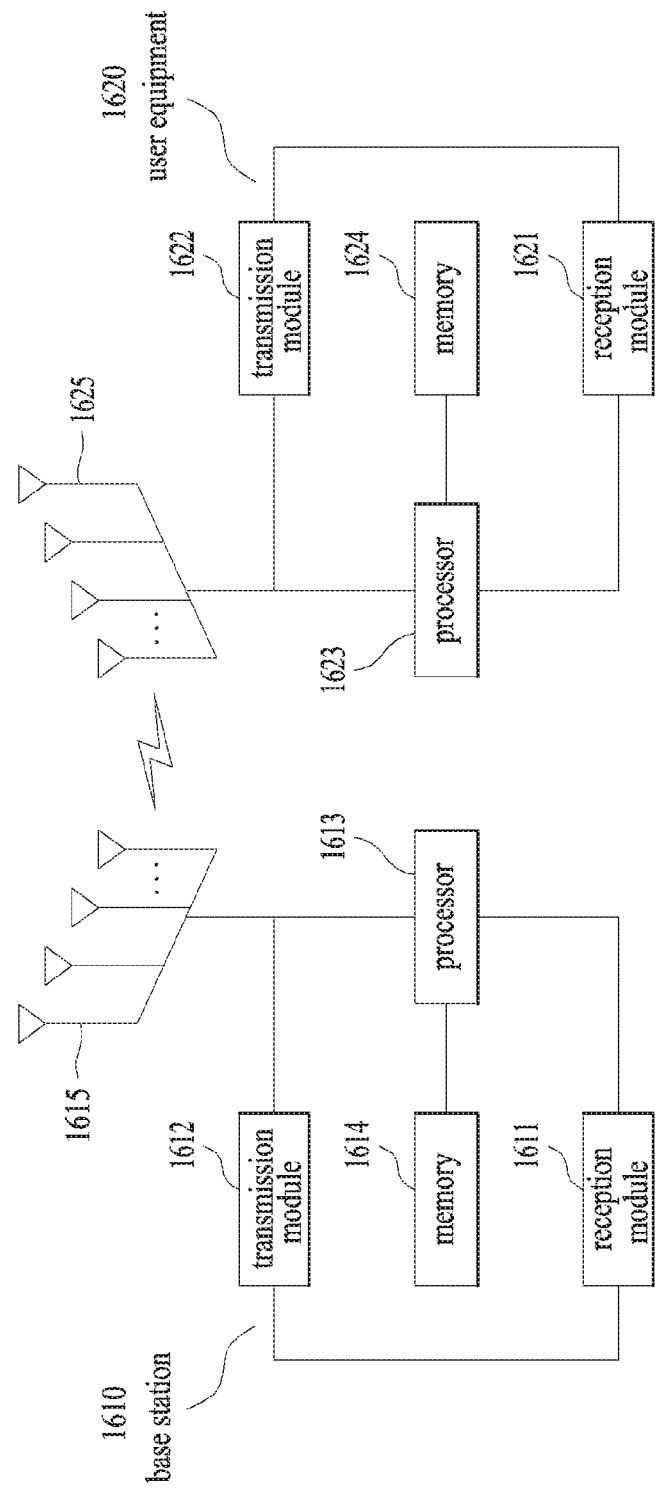
FIG. 16 is a diagram for a configuration of a base station and a user equipment applicable to one embodiment of the present invention.

FIG. 16 is a diagram for a base station and a user equipment capable of being applied to an embodiment of the present invention.

If a relay is included in a wireless communication system, communication is performed between a base station and the relay in backhaul link and communication is performed between the relay and a user equipment in access link. Hence, the base station and the user equipment shown in the drawing can be replaced with the relay in accordance with a situation.

Referring to FIG. 16, a wireless communication system includes a base station (BS) 1610 and a user equipment (UE) 1620. The BS 1610 includes a processor 1613, a memory 1614 and a radio frequency (RF) unit 1611/1612. The processor 1613 can be configured to implement the proposed functions, processes and/or methods. The memory 1614 is connected with the processor 1613 and then stores various kinds of information associated with an operation of the processor 1613. The RF unit 1616 is connected with the processor 1613 and transmits and/or receives a radio signal. The user equipment 1620 includes a processor 1623, a memory 1624 and a radio frequency (RF) unit 1621/1622. The processor 1623 can be configured to implement the proposed functions, processes and/or methods. The memory 1624 is connected with the processor 1623 and then stores various kinds of information associated with an operation of the processor 1623. The RF unit 1621/1622 is connected with the processor 1623 and transmits and/or receives a radio signal. The base station 1610 and/or the user equipment 1620 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

Detailed explanation on the preferred embodiment of the present invention disclosed as mentioned in the foregoing description is provided for those in the art to implement and execute the present invention. While the present invention has been described and illustrated herein with reference to the preferred embodiments thereof, it will be apparent to those skilled in the art that various modifications and variations can be made therein without departing from the spirit and scope of the invention. For instance, those skilled in the art can use each component described in the aforementioned embodiments in a manner of combining it with each other. Hence, the present invention may be non-limited to the aforementioned embodiments of the present invention and intends to provide a scope matched with principles and new characteristics disclosed in the present invention.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The present invention can be used for a wireless communication device such as a terminal, a relay, a base station and the like.

What is claimed is:
1. A method of receiving a downlink control channel for a single antenna port transmission from a base station (BS) by a user equipment (UE) in a wireless communication system, the method comprising:

receiving, via a higher layer, an indicator indicating whether or not to use a second UE specific reference signal parameter table instead of a first UE specific reference signal parameter table; and receiving a physical downlink control channel carrying information indicating one parameter set among a plurality of parameter sets included in the first UE specific reference signal parameter table or the second UE specific reference signal parameter table, wherein the first UE specific reference signal parameter table is for a first antenna port group, and wherein the second UE specific reference signal parameter table is for both the first antenna port group and a second antenna port group.

2. The method of claim 1, wherein UE specific reference signals defined by the first and second antenna port groups are mapped to same resources by applying orthogonal cover codes (OCCs).

3. The method of claim 1, wherein:

each of parameter sets included in the first UE specific reference signal parameter table comprises an antenna port index and a scrambling identity for the single antenna port transmission; and each of parameter sets included in the second UE specific reference signal parameter table comprises the antenna port index, the scrambling identity and a length of an orthogonal cover code (OCC) for the single antenna port transmission.

4. The method of claim 3, wherein the length of the OCC is 2 or 4.

5. The method of claim 1, wherein:

the first antenna port group comprises antenna ports 7 and 8; and the second antenna port group comprises antenna ports 11 and 13.

6. A method of transmitting a downlink control channel for a single antenna port transmission to a user equipment (UE) by a base station (BS) in a wireless communication system, the method comprising:

transmitting, via a higher layer, an indicator indicating whether or not to use a second UE specific reference signal parameter table instead of a first UE specific reference signal parameter table; and transmitting a physical downlink control channel carrying information indicating one parameter set among a plurality of parameter sets included in the first UE specific reference signal parameter table or the second UE specific reference signal parameter table, wherein the first UE specific reference signal parameter table is for a first antenna port group, and wherein the second UE specific reference signal parameter table is for both the first antenna port group and a second antenna port group.

7. The method of claim 6, wherein UE specific reference signals defined by the first and second antenna port groups are mapped to same resources by applying orthogonal cover codes (OCCs).

8. The method of claim 6, wherein:

each of parameter sets included in the first UE specific reference signal parameter table comprises an antenna port index and a scrambling identity for the single antenna port transmission; and each of parameter sets included in the second UE specific reference signal parameter table comprises the antenna port index, the scrambling identity and a length of an orthogonal cover code (OCC) for the single antenna port transmission.

9. The method of claim 8, wherein the length of the OCC is 2 or 4.

10. The method of claim 6, wherein:

the first antenna port group comprises antenna ports 7 and 8; and the second antenna port group comprises antenna ports 11 and 13.

11. A user equipment (UE) in a wireless communication system, the UE comprising:

a memory; and at least one processor coupled to the memory and configured to:

receive, via a higher layer, an indicator indicating whether or not to use a second UE specific reference signal parameter table instead of a first UE specific reference signal parameter table; and receive a physical downlink control channel carrying information indicating one parameter set among a plurality of parameter sets included in the first UE specific reference signal parameter table or the second UE specific reference signal parameter table, wherein the first UE specific reference signal parameter table is for a first antenna port group, and wherein the second UE specific reference signal parameter table is for both the first antenna port group and a second antenna port group.

12. The UE of claim 11, wherein UE specific reference signals defined by the first and second antenna port groups are mapped to same resources by applying orthogonal cover codes (OCCs).

13. The UE of claim 11, wherein:

each of parameter sets included in the first UE specific reference signal parameter table comprises an antenna port index and a scrambling identity for the single antenna port transmission; and each of parameter sets included in the second UE specific reference signal parameter table comprises the antenna port index, the scrambling identity and a length of an orthogonal cover code (OCC) for the single antenna port transmission.

14. The UE of claim 13, wherein the length of the OCC is 2 or 4.

15. The UE of claim 11, wherein:

the first antenna port group comprises antenna ports 7 and 8; and the second antenna port group comprises antenna ports 11 and 13.

16. A base station (BS) in a wireless communication system, the BS comprising:

a memory; and at least one processor coupled to the memory and configured to:

transmit, via a higher layer, an indicator indicating whether or not to use a second user equipment (UE) specific reference signal parameter table instead of a first UE specific reference signal parameter table; and transmit a physical downlink control channel carrying information indicating one parameter set among a plurality of parameter sets included in the first UE specific reference signal parameter table or the second UE specific reference signal parameter table, wherein the first UE specific reference signal parameter table is for a first antenna port group, and wherein the second UE specific reference signal parameter table is for both the first antenna port group and a second antenna port group.

17. The BS of claim 16, wherein UE specific reference signals defined by the first and second antenna port groups are mapped to same resources by applying orthogonal cover codes (OCCs).

18. The BS of claim 16, wherein:
each of parameter sets included in the first UE specific reference signal parameter table comprises an antenna port index and a scrambling identity for the single antenna port transmission; and
each of parameter sets included in the second UE specific reference signal parameter table comprises the antenna port index, the scrambling identity and a length of an orthogonal cover code (OCC) for the single antenna port transmission.

19. The BS of claim 18, wherein the length of the OCC is 2 or 4.

20. The BS of claim 16, wherein:
the first antenna port group comprises antenna ports 7 and 8; and
the second antenna port group comprises antenna ports 11 and 13.

* * * * *